US011811847B2

(12) United States Patent
Singh et al.

(10) Patent No.: US 11,811,847 B2
(45) Date of Patent: *Nov. 7, 2023

(54) SERVER-SIDE WORKFLOW IMPROVEMENT BASED ON CLIENT-SIDE DATA MINING

(71) Applicant: ServiceNow, Inc., Santa Clara, CA (US)

(72) Inventors: Manjeet Singh, Santa Clara, CA (US); Hans Jochen Gerhard Pohle, Amsterdam (NL); Vadim Denisov, Amsterdam (NL); Ciprian Mocanu, Amsterdam (NL)

(73) Assignee: ServiceNow, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/863,849

(22) Filed: Jul. 13, 2022

(65) Prior Publication Data

US 2023/0033909 A1 Feb. 2, 2023

Related U.S. Application Data

(63) Continuation of application No. 17/388,639, filed on Jul. 29, 2021, now Pat. No. 11,418,571.

(51) Int. Cl.
*H04L 67/01* (2022.01)
*H04L 67/50* (2022.01)

(52) U.S. Cl.
CPC ............ *H04L 67/01* (2022.05); *H04L 67/535* (2022.05)

(58) Field of Classification Search
CPC .............................. H04L 67/01; H04L 67/535
See application file for complete search history.

(56) References Cited

U.S. PATENT DOCUMENTS

| 4,941,084 A | 7/1990 | Terada et al. |
| 5,185,860 A | 2/1993 | Wu |

(Continued)

FOREIGN PATENT DOCUMENTS

| EP | 0433979 | 6/1991 |
| EP | 1607824 | 12/2005 |

(Continued)

*Primary Examiner* — Minh Chau Nguyen
(74) *Attorney, Agent, or Firm* — McDonnell Boehnen Hulbert & Berghoff LLP

(57) ABSTRACT

An embodiment may involve a server-side log collected by a server device, where the server-side log includes a set of entries indicating a unique identifier, and wherein the unique identifier is assigned to a work item of a server-based application executed by the server device. The embodiment may further involve one or more processors configured to: receive, from a client device disposed upon a network, a client-side log, wherein the client-side log includes operational data related to usage of a client-based application executed by the client device; identify, from the operational data, the client-based application and one or more activities performed by the client-based application; determine that the one or more activities are related to the unique identifier; based on the one or more activities, determine an action that can be taken to improve efficacy of the server-based application; and write, to the persistent storage, a representation of the action.

20 Claims, 14 Drawing Sheets

(56) References Cited

U.S. PATENT DOCUMENTS

| | | |
|---|---|---|
| 5,237,518 A | 8/1993 | Sztipanovits et al. |
| 5,261,097 A | 11/1993 | Saxon |
| 5,265,252 A | 11/1993 | Rawson, III et al. |
| 5,367,685 A | 11/1994 | Gosling |
| 5,390,297 A | 2/1995 | Barber et al. |
| 5,442,791 A | 8/1995 | Wrabetz et al. |
| 5,452,415 A | 9/1995 | Hotka |
| 5,522,042 A | 5/1996 | Fee et al. |
| 5,533,116 A | 7/1996 | Vesterinen |
| 5,655,081 A | 8/1997 | Bonnell et al. |
| 5,659,736 A | 8/1997 | Hasegawa et al. |
| 5,671,412 A | 9/1997 | Christiano |
| 5,696,701 A | 12/1997 | Burgess et al. |
| 5,715,463 A | 2/1998 | Merkin |
| 5,745,879 A | 4/1998 | Wyman |
| 5,761,502 A | 6/1998 | Jacobs |
| 5,764,913 A | 6/1998 | Jancke et al. |
| 5,887,139 A | 3/1999 | Madison, Jr. et al. |
| 5,909,217 A | 6/1999 | Bereiter |
| 5,937,165 A | 8/1999 | Schwaller et al. |
| 5,949,976 A | 9/1999 | Chappelle |
| 5,978,594 A | 11/1999 | Bonnell et al. |
| 6,021,437 A | 2/2000 | Chen et al. |
| 6,041,347 A | 3/2000 | Harsham et al. |
| 6,088,717 A | 7/2000 | Reed et al. |
| 6,101,500 A | 8/2000 | Lau |
| 6,128,016 A | 10/2000 | Coelho et al. |
| 6,131,118 A | 10/2000 | Stupek, Jr. et al. |
| 6,134,581 A | 10/2000 | Ismael et al. |
| 6,138,122 A | 10/2000 | Smith et al. |
| 6,148,335 A | 11/2000 | Haggard et al. |
| 6,166,732 A | 12/2000 | Mitchell et al. |
| 6,167,448 A | 12/2000 | Hemphill et al. |
| 6,175,866 B1 | 1/2001 | Holloway et al. |
| 6,175,878 B1 | 1/2001 | Seaman et al. |
| 6,260,050 B1 | 7/2001 | Yost et al. |
| 6,263,457 B1 | 7/2001 | Anderson et al. |
| 6,272,150 B1 | 8/2001 | Hrastar et al. |
| 6,336,138 B1 | 1/2002 | Caswell et al. |
| 6,363,421 B2 | 3/2002 | Barker et al. |
| 6,393,386 B1 | 5/2002 | Zager et al. |
| 6,397,245 B1 | 5/2002 | Johnson, II et al. |
| 6,434,626 B1 | 8/2002 | Prakash et al. |
| 6,438,592 B1 | 8/2002 | Killian |
| 6,456,306 B1 | 9/2002 | Chin et al. |
| 6,466,932 B1 | 10/2002 | Dennis et al. |
| 6,487,590 B1 | 11/2002 | Foley et al. |
| 6,505,248 B1 | 1/2003 | Casper et al. |
| 6,526,442 B1 | 2/2003 | Stupek, Jr. et al. |
| 6,621,823 B1 | 9/2003 | Mellquist et al. |
| 6,707,795 B1 | 3/2004 | Noorhosseini et al. |
| 6,742,015 B1 | 5/2004 | Bowman-Amuah |
| 6,763,380 B1 | 7/2004 | Mayton et al. |
| 6,816,898 B1 | 11/2004 | Scarpelli et al. |
| 6,895,586 B1 | 5/2005 | Brasher et al. |
| 6,948,175 B1 | 9/2005 | Fong et al. |
| 6,985,901 B1 | 1/2006 | Sachse et al. |
| 7,003,564 B2 | 2/2006 | Greuel et al. |
| 7,028,228 B1 | 4/2006 | Lovy et al. |
| 7,043,537 B1 | 5/2006 | Pratt |
| 7,043,661 B2 | 5/2006 | Valadarsky et al. |
| 7,062,683 B2 | 6/2006 | Warpenburg et al. |
| 7,096,459 B2 | 8/2006 | Keller et al. |
| 7,146,574 B2 | 12/2006 | Goldthwaite et al. |
| 7,197,466 B1 | 3/2007 | Peterson et al. |
| 7,215,360 B2 | 5/2007 | Gupta |
| 7,216,304 B1 | 5/2007 | Gourdol et al. |
| 7,222,147 B1 | 5/2007 | Black et al. |
| 7,281,170 B2 | 10/2007 | Taylor et al. |
| 7,412,502 B2 | 8/2008 | Fearn et al. |
| 7,505,872 B2 | 3/2009 | Keller et al. |
| 7,593,013 B2 | 9/2009 | Agutter et al. |
| 7,596,716 B2 | 9/2009 | Frost et al. |
| 7,617,073 B2 | 11/2009 | Trinon et al. |
| 7,660,731 B2 | 2/2010 | Chaddha et al. |
| 7,676,294 B2 | 3/2010 | Baier et al. |
| 7,676,437 B2 | 3/2010 | Satkunanathan et al. |
| 7,840,490 B1 | 11/2010 | Sellers et al. |
| 7,877,783 B1 | 1/2011 | Cline et al. |
| 7,890,869 B1 | 2/2011 | Mayer et al. |
| 7,966,398 B2 | 6/2011 | Wiles, Jr. |
| 8,060,396 B1 | 11/2011 | Bessler et al. |
| 8,196,210 B2 | 6/2012 | Sterin |
| 8,321,948 B2 | 11/2012 | Robinson et al. |
| 8,407,669 B2 | 3/2013 | Yee et al. |
| 8,554,750 B2 | 10/2013 | Rangarajan et al. |
| 8,595,647 B2 | 11/2013 | Sabin et al. |
| 8,620,818 B2 | 12/2013 | Hughes et al. |
| 8,646,093 B2 | 2/2014 | Myers et al. |
| 8,674,992 B2 | 3/2014 | Poston et al. |
| 8,725,647 B2 | 5/2014 | Disciascio et al. |
| 9,053,460 B2 | 6/2015 | Gilbert et al. |
| 9,552,356 B1 * | 1/2017 | Edwards ............ G06F 30/00 |
| 10,366,146 B2 * | 7/2019 | Alon ............... H04L 67/306 |
| 10,673,963 B1 | 6/2020 | Feiguine et al. |
| 10,749,943 B1 | 8/2020 | Feiguine et al. |
| 10,771,344 B2 | 9/2020 | Bitterfeld et al. |
| 10,824,650 B2 | 11/2020 | Bar Oz et al. |
| 10,944,654 B2 | 3/2021 | Rimar et al. |
| 11,089,115 B2 | 8/2021 | Garty et al. |
| 11,095,506 B1 | 8/2021 | Erblat et al. |
| 2002/0116340 A1 | 8/2002 | Hellberg et al. |
| 2002/0133584 A1 | 9/2002 | Greuel et al. |
| 2002/0158969 A1 | 10/2002 | Gupta |
| 2003/0118087 A1 | 6/2003 | Goldthwaite et al. |
| 2003/0200293 A1 | 10/2003 | Fearn et al. |
| 2005/0015217 A1 | 1/2005 | Weidl et al. |
| 2005/0091356 A1 | 4/2005 | Izzo |
| 2006/0026453 A1 | 2/2006 | Frost et al. |
| 2006/0095461 A1 | 5/2006 | Raymond |
| 2006/0179058 A1 | 8/2006 | Bram et al. |
| 2006/0293942 A1 | 12/2006 | Chaddha et al. |
| 2007/0033279 A1 | 2/2007 | Battat et al. |
| 2007/0188494 A1 | 8/2007 | Agutter et al. |
| 2007/0255821 A1 | 11/2007 | Ge et al. |
| 2007/0288389 A1 | 12/2007 | Vaughan et al. |
| 2008/0133289 A1 | 6/2008 | Armour et al. |
| 2008/0148253 A1 | 6/2008 | Badwe et al. |
| 2008/0319779 A1 | 12/2008 | Hughes et al. |
| 2009/0088875 A1 | 4/2009 | Baier et al. |
| 2009/0228984 A1 | 9/2009 | Sterin |
| 2010/0110932 A1 | 5/2010 | Doran et al. |
| 2018/0123940 A1 | 5/2018 | Rimar et al. |
| 2018/0278499 A1 * | 9/2018 | Diwakar ............ H04L 43/045 |
| 2019/0104398 A1 | 4/2019 | Owen et al. |
| 2020/0050689 A1 | 2/2020 | Tal et al. |
| 2020/0204443 A1 | 6/2020 | Bar Oz et al. |
| 2021/0194764 A1 | 6/2021 | Badyan et al. |
| 2022/0029886 A1 | 1/2022 | Hameiri et al. |

FOREIGN PATENT DOCUMENTS

| | | |
|---|---|---|
| WO | WO 99/34285 | 7/1999 |
| WO | WO 00/52559 | 9/2000 |
| WO | WO 01/79970 | 10/2001 |

* cited by examiner

| STATE ↑1002 | APPLICATIONS ↑1004 | FREQUENCY ↑1006 | STEP COUNT ↑1008 | DURATION ↑1010 |
|---|---|---|---|---|
| IN PROGRESS | PPT, WORD | 450 | 88 | 20:56 |
| IN PROGRESS | SAP, EXCEL | 470 | 35 | 18:00 |
| IN PROGRESS | PPT, CALCULATOR | 230 | 33 | 14:43 |
| IN PROGRESS | WORKDAY, PHOTOS | 171 | 23 | 2:01 |

SERVER-SIDE WORKFLOW IMPROVEMENT BASED ON CLIENT-SIDE DATA MINING

CROSS REFERENCE TO RELATED APPLICATION

This application is a continuation of and claims priority to U.S. patent application Ser. No. 17/388,639, filed Jul. 29, 2021, which is hereby incorporated by reference in its entirety.

BACKGROUND

Remote network management platforms are often used by enterprises and other organizations to facilitate workflows—automated or semi-automated multi-step processes that occur between any combination of people and computing systems. These workflows can be complex, involving numerous states and transitions therebetween, and may be used by various individuals in different roles. As a consequence, when workflows exhibit performance inefficiencies, such as completion delays, incorrect outcomes, and/or unexpected cycling, it can be difficult to determine the root cause of these problems.

SUMMARY

The embodiments herein overcome these and other technical problems by deploying client-side collectors on end-point devices employed by users and collecting information regarding how these users are interacting with applications as workflows are carried out. When combined with server-side logs, a more comprehensive view of workflow efficiency can be determined. Doing so involves correlating a workflow identifier represented in the server-side logs with activities captured by the client-side collectors. Then, a set of rules can be applied to make recommendations or suggestions for workflow performance improvement.

Accordingly, a first example embodiment may involve persistent storage containing a server-side log collected by a server device, wherein the server-side log includes a set of entries indicating a unique identifier, and wherein the unique identifier is assigned to a work item of a server-based application executed by the server device. The first example embodiment may also involve one or more processors configured to: receive, from a client device disposed upon a network, a client-side log, wherein the client-side log includes operational data related to usage of a client-based application executed by the client device; identify, from the operational data, the client-based application and one or more activities performed by the client-based application; determine that the one or more activities are related to the unique identifier; based on the one or more activities, determine an action that can be taken to improve efficacy of the server-based application; and write, to the persistent storage, a representation of the action.

A second example embodiment may involve obtaining, from persistent storage, a server-side log collected by a server device, wherein the server-side log includes a set of entries indicating a unique identifier, and wherein the unique identifier is assigned to a work item of a server-based application executed by the server device. The second example embodiment may also involve receiving, from a client device disposed upon a network, a client-side log, wherein the client-side log includes operational data related to usage of a client-based application executed by the client device. The second example embodiment may also involve identifying, from the operational data, the client-based application and one or more activities performed by the client-based application. The second example embodiment may also involve determining that the one or more activities are related to the unique identifier. The second example embodiment may also involve, based on the one or more activities, determining an action that can be taken to improve efficacy of the server-based application. The second example embodiment may also involve writing, to the persistent storage, a representation of the action.

In a third example embodiment, an article of manufacture may include a non-transitory computer-readable medium, having stored thereon program instructions that, upon execution by a computing system, cause the computing system to perform operations in accordance with the first and/or second example embodiment.

In a fourth example embodiment, a computing system may include at least one processor, as well as memory and program instructions. The program instructions may be stored in the memory, and upon execution by the at least one processor, cause the computing system to perform operations in accordance with the first and/or second example embodiment.

In a fifth example embodiment, a system may include various means for carrying out each of the operations of the first and/or second example embodiment.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF THE DRAWINGS

FIG. 10 depicts a table, in accordance with example embodiments.

DETAILED DESCRIPTION

Figure 1:
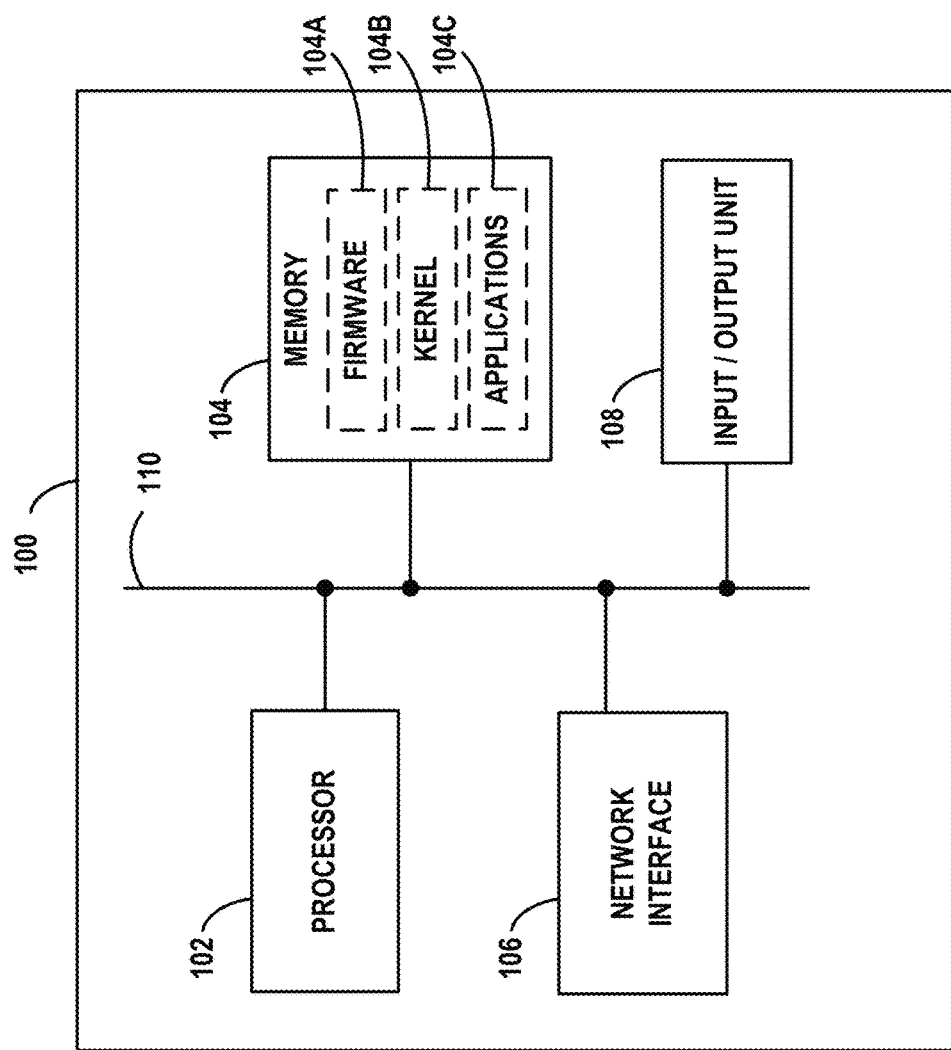
FIG. 1 illustrates a schematic drawing of a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. Introduction

A large enterprise is a complex entity with many interrelated operations. Some of these are found across the enterprise, such as human resources (HR), supply chain, information technology (IT), and finance. However, each enterprise also has its own unique operations that provide essential capabilities and/or create competitive advantages.

To support widely-implemented operations, enterprises typically use off-the-shelf software applications, such as customer relationship management (CRM) and human capital management (HCM) packages. However, they may also need custom software applications to meet their own unique requirements. A large enterprise often has dozens or hundreds of these custom software applications. Nonetheless, the advantages provided by the embodiments herein are not limited to large enterprises and may be applicable to an enterprise, or any other type of organization, of any size.

Many such software applications are developed by individual departments within the enterprise. These range from simple spreadsheets to custom-built software tools and databases. But the proliferation of siloed custom software applications has numerous disadvantages. It negatively impacts an enterprise's ability to run and grow its operations, innovate, and meet regulatory requirements. The enterprise may find it difficult to integrate, streamline, and enhance its operations due to lack of a single system that unifies its subsystems and data.

To efficiently create custom applications, enterprises would benefit from a remotely-hosted application platform that eliminates unnecessary development complexity. The goal of such a platform would be to reduce time-consuming, repetitive application development tasks so that software engineers and individuals in other roles can focus on developing unique, high-value features.

In order to achieve this goal, the concept of Application Platform as a Service (aPaaS) is introduced, to intelligently automate workflows throughout the enterprise. An aPaaS system is hosted remotely from the enterprise, but may access data, applications, and services within the enterprise by way of secure connections. Such an aPaaS system may have a number of advantageous capabilities and characteristics. These advantages and characteristics may be able to improve the enterprise's operations and workflows for IT, HR, CRM, customer service, application development, and security.

The aPaaS system may support development and execution of model-view-controller (MVC) applications. MVC applications divide their functionality into three interconnected parts (model, view, and controller) in order to isolate representations of information from the manner in which the information is presented to the user, thereby allowing for efficient code reuse and parallel development. These applications may be web-based, and offer create, read, update, and delete (CRUD) capabilities. This allows new applications to be built on a common application infrastructure.

The aPaaS system may support standardized application components, such as a standardized set of widgets for graphical user interface (GUI) development. In this way, applications built using the aPaaS system have a common look and feel. Other software components and modules may be standardized as well. In some cases, this look and feel can be branded or skinned with an enterprise's custom logos and/or color schemes.

The aPaaS system may support the ability to configure the behavior of applications using metadata. This allows application behaviors to be rapidly adapted to meet specific needs. Such an approach reduces development time and increases flexibility. Further, the aPaaS system may support GUI tools that facilitate metadata creation and management, thus reducing errors in the metadata.

The aPaaS system may support clearly-defined interfaces between applications, so that software developers can avoid unwanted inter-application dependencies. Thus, the aPaaS system may implement a service layer in which persistent state information and other data are stored.

The aPaaS system may support a rich set of integration features so that the applications thereon can interact with legacy applications and third-party applications. For instance, the aPaaS system may support a custom employee-onboarding system that integrates with legacy HR, IT, and accounting systems.

The aPaaS system may support enterprise-grade security. Furthermore, since the aPaaS system may be remotely hosted, it should also utilize security procedures when it interacts with systems in the enterprise or third-party networks and services hosted outside of the enterprise. For example, the aPaaS system may be configured to share data amongst the enterprise and other parties to detect and identify common security threats.

Other features, functionality, and advantages of an aPaaS system may exist. This description is for purpose of example and is not intended to be limiting.

As an example of the aPaaS development process, a software developer may be tasked to create a new application using the aPaaS system. First, the developer may define the data model, which specifies the types of data that the application uses and the relationships therebetween. Then, via a GUI of the aPaaS system, the developer enters (e.g., uploads) the data model. The aPaaS system automatically creates all of the corresponding database tables, fields, and relationships, which can then be accessed via an object-oriented services layer.

In addition, the aPaaS system can also build a fully-functional MVC application with client-side interfaces and server-side CRUD logic. This generated application may serve as the basis of further development for the user. Advantageously, the developer does not have to spend a large amount of time on basic application functionality. Further, since the application may be web-based, it can be accessed from any Internet-enabled client device. Alternatively or additionally, a local copy of the application may be able to be accessed, for instance, when Internet service is not available.

The aPaaS system may also support a rich set of pre-defined functionality that can be added to applications. These features include support for searching, email, templating, workflow design, reporting, analytics, social media, scripting, mobile-friendly output, and customized GUIs.

Such an aPaaS system may represent a GUI in various ways. For example, a server device of the aPaaS system may generate a representation of a GUI using a combination of HTML, and JAVASCRIPT®. The JAVASCRIPT® may include client-side executable code, server-side executable code, or both. The server device may transmit or otherwise provide this representation to a client device for the client device to display on a screen according to its locally-defined look and feel. Alternatively, a representation of a GUI may take other forms, such as an intermediate form (e.g., JAVA® byte-code) that a client device can use to directly generate graphical output therefrom. Other possibilities exist.

Further, user interaction with GUI elements, such as buttons, menus, tabs, sliders, checkboxes, toggles, etc. may be referred to as "selection", "activation", or "actuation" thereof. These terms may be used regardless of whether the GUI elements are interacted with by way of keyboard, pointing device, touchscreen, or another mechanism.

An aPaaS architecture is particularly powerful when integrated with an enterprise's network and used to manage such a network. The following embodiments describe architectural and functional aspects of example aPaaS systems, as well as the features and advantages thereof.

II. Example Computing Devices and Cloud-Based Computing Environments

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 100 includes processor 102, memory 104, network interface 106, and input/output unit 108, all of which may be coupled by system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently-used instructions and data.

Memory 104 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, memory 104 represents both main memory units, as well as long-term storage. Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling and management of processes, input/output, and communication. Kernel 104B may also include device drivers that allow the operating system to communicate with the hardware modules (e.g., memory units, networking interfaces, ports, and buses) of computing device 100. Applications 104C may be one or more user-space software programs, such as web browsers or email clients, as well as any software libraries used by these programs. Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet media, such as coaxial cables or power lines, or over wide-area media, such as Synchronous Optical Networking (SONET) or digital subscriber line (DSL) technologies. Network interface 106 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing device 100 may include Ethernet, BLUETOOTH®, and Wifi interfaces.

Input/output unit 108 may facilitate user and peripheral device interaction with computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more computing devices like computing device 100 may be deployed to support an aPaaS architecture. The exact physical location, connectivity, and configuration of these computing devices may be unknown and/or unimportant to client devices. Accordingly, the computing devices may be referred to as "cloud-based" devices that may be housed at various remote data center locations.

Figure 2:
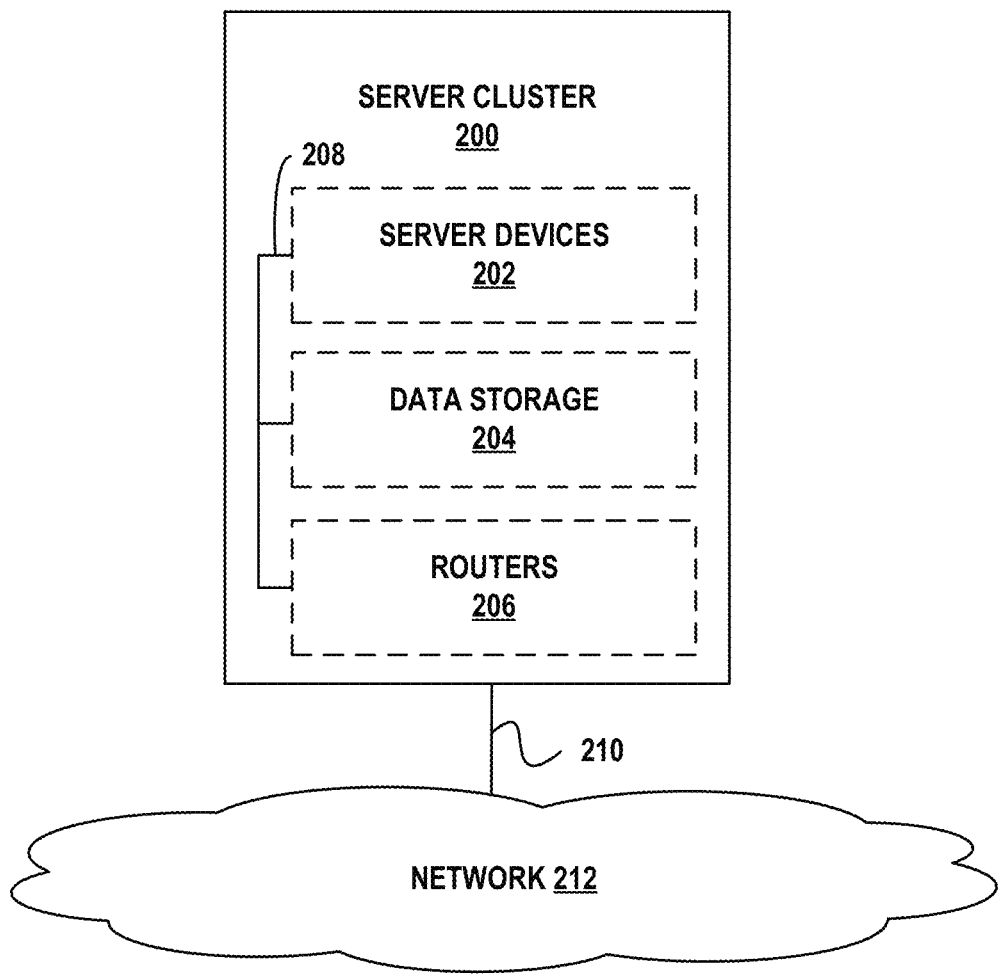
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purposes of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via local cluster network 208, and/or (ii) network communications between server cluster 200 and other devices via communication link 210 to network 212.

Additionally, the configuration of routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency, and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from data storage 204. This transmission and retrieval may take the form of SQL queries or other types of database queries, and the output of such queries, respectively. Additional text, images, video, and/or audio may be included as well. Furthermore, server devices 202 may organize the received data into web page or web application representations. Such a representation may take the form of a markup language, such as the hypertext markup language (HTML), the extensible markup language (XML), or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JAVASCRIPT®, and so on. Computer program code written in these languages may facilitate the providing of web pages to client devices, as well as client device interaction with the web pages. Alternatively or additionally, JAVA® may be used to facilitate generation of web pages and/or to provide web application functionality.

III. Example Remote Network Management Architecture

Figure 3:
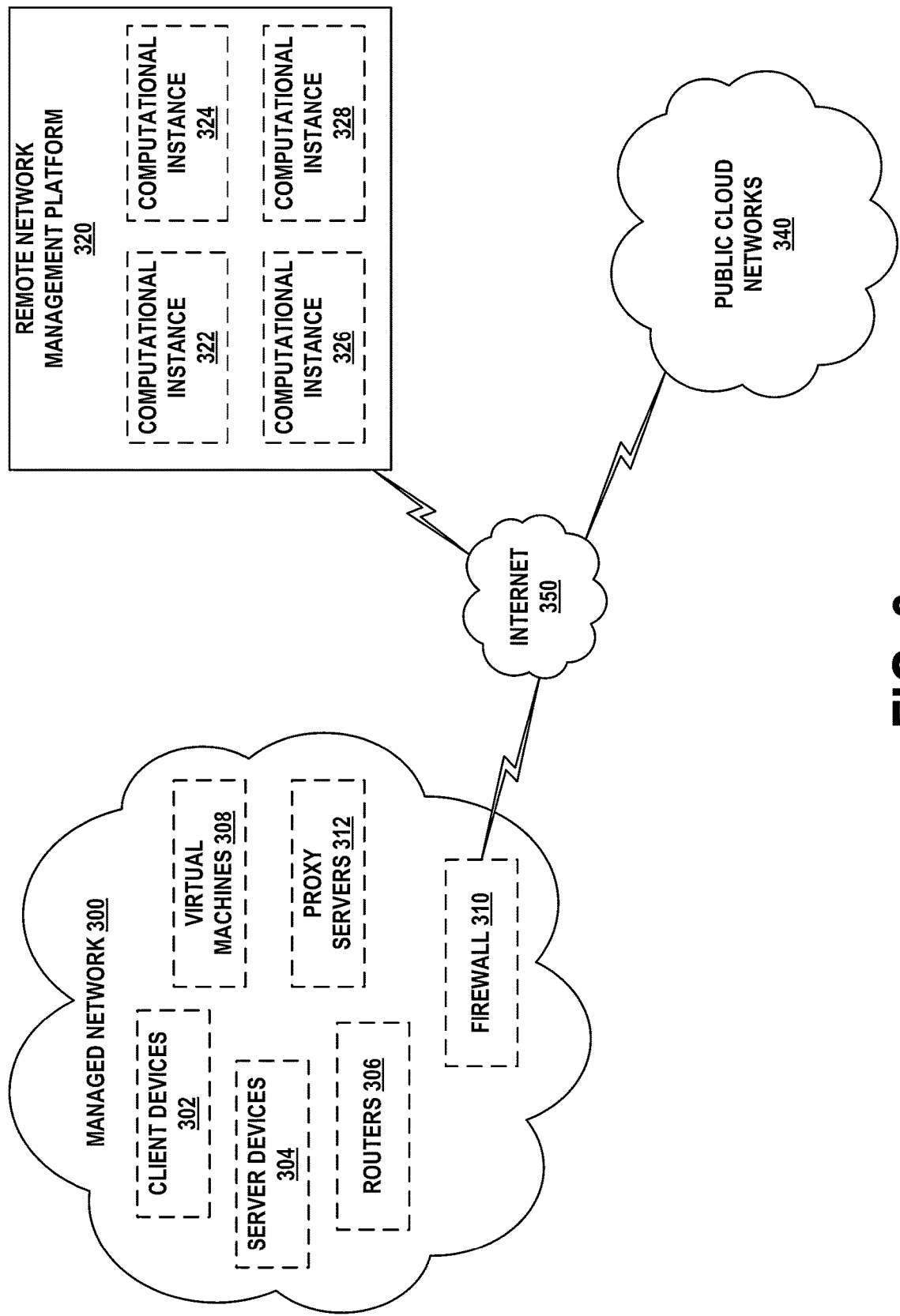
FIG. 3 depicts a remote network management architecture, in accordance with example embodiments.

FIG. 3 depicts a remote network management architecture, in accordance with example embodiments. This architecture includes three main components—managed network 300, remote network management platform 320, and public cloud networks 340—all connected by way of Internet 350.

A. Managed Networks

Managed network 300 may be, for example, an enterprise network used by an entity for computing and communications tasks, as well as storage of data. Thus, managed network 300 may include client devices 302, server devices 304, routers 306, virtual machines 308, firewall 310, and/or proxy servers 312. Client devices 302 may be embodied by computing device 100, server devices 304 may be embodied by computing device 100 or server cluster 200, and routers 306 may be any type of router, switch, or gateway.

Virtual machines 308 may be embodied by one or more of computing device 100 or server cluster 200. In general, a virtual machine is an emulation of a computing system, and mimics the functionality (e.g., processor, memory, and communication resources) of a physical computer. One physical computing system, such as server cluster 200, may support up to thousands of individual virtual machines. In some embodiments, virtual machines 308 may be managed by a centralized server device or application that facilitates allocation of physical computing resources to individual virtual machines, as well as performance and error reporting. Enterprises often employ virtual machines in order to allocate computing resources in an efficient, as needed fashion. Providers of virtualized computing systems include VMWARE® and MICROSOFT®.

Firewall 310 may be one or more specialized routers or server devices that protect managed network 300 from unauthorized attempts to access the devices, applications, and services therein, while allowing authorized communication that is initiated from managed network 300. Firewall 310 may also provide intrusion detection, web filtering, virus scanning, application-layer gateways, and other applications or services. In some embodiments not shown in FIG. 3, managed network 300 may include one or more virtual private network (VPN) gateways with which it communicates with remote network management platform 320 (see below).

Managed network 300 may also include one or more proxy servers 312. An embodiment of proxy servers 312 may be a server application that facilitates communication and movement of data between managed network 300, remote network management platform 320, and public cloud networks 340. In particular, proxy servers 312 may be able to establish and maintain secure communication sessions with one or more computational instances of remote network management platform 320. By way of such a session, remote network management platform 320 may be able to discover and manage aspects of the architecture and configuration of managed network 300 and its components. Possibly with the assistance of proxy servers 312, remote network management platform 320 may also be able to discover and manage aspects of public cloud networks 340 that are used by managed network 300.

Firewalls, such as firewall 310, typically deny all communication sessions that are incoming by way of Internet 350, unless such a session was ultimately initiated from behind the firewall (i.e., from a device on managed network 300) or the firewall has been explicitly configured to support the session. By placing proxy servers 312 behind firewall 310 (e.g., within managed network 300 and protected by firewall 310), proxy servers 312 may be able to initiate these communication sessions through firewall 310. Thus, firewall 310 might not have to be specifically configured to support incoming sessions from remote network management platform 320, thereby avoiding potential security risks to managed network 300.

In some cases, managed network 300 may consist of a few devices and a small number of networks. In other deployments, managed network 300 may span multiple physical locations and include hundreds of networks and hundreds of thousands of devices. Thus, the architecture depicted in FIG. 3 is capable of scaling up or down by orders of magnitude.

Furthermore, depending on the size, architecture, and connectivity of managed network 300, a varying number of proxy servers 312 may be deployed therein. For example, each one of proxy servers 312 may be responsible for communicating with remote network management platform 320 regarding a portion of managed network 300. Alternatively or additionally, sets of two or more proxy servers may be assigned to such a portion of managed network 300 for purposes of load balancing, redundancy, and/or high availability.

B. Remote Network Management Platforms

Remote network management platform 320 is a hosted environment that provides aPaaS services to users, particularly to the operator of managed network 300. These services may take the form of web-based portals, for example, using the aforementioned web-based technologies. Thus, a user can securely access remote network management platform 320 from, for example, client devices 302, or potentially from a client device outside of managed network 300. By way of the web-based portals, users may design, test, and deploy applications, generate reports, view analytics, and perform other tasks. Remote network management platform 320 may also be referred to as a multi-application platform.

As shown in FIG. 3, remote network management platform 320 includes four computational instances 322, 324, 326, and 328. Each of these computational instances may represent one or more server nodes operating dedicated copies of the aPaaS software and/or one or more database nodes. The arrangement of server and database nodes on physical server devices and/or virtual machines can be flexible and may vary based on enterprise needs. In combination, these nodes may provide a set of web portals, services, and applications (e.g., a wholly-functioning aPaaS system) available to a particular enterprise. In some cases, a single enterprise may use multiple computational instances.

For example, managed network 300 may be an enterprise customer of remote network management platform 320, and may use computational instances 322, 324, and 326. The reason for providing multiple computational instances to one customer is that the customer may wish to independently develop, test, and deploy its applications and services. Thus, computational instance 322 may be dedicated to application development related to managed network 300, computational instance 324 may be dedicated to testing these applications, and computational instance 326 may be dedicated to the live operation of tested applications and services. A computational instance may also be referred to as a hosted instance, a remote instance, a customer instance, or by some other designation. Any application deployed onto a computational instance may be a scoped application, in that its access to databases within the computational instance can be restricted to certain elements therein (e.g., one or more particular database tables or particular rows within one or more database tables).

For purposes of clarity, the disclosure herein refers to the arrangement of application nodes, database nodes, aPaaS software executing thereon, and underlying hardware as a "computational instance." Note that users may colloquially refer to the graphical user interfaces provided thereby as "instances." But unless it is defined otherwise herein, a "computational instance" is a computing system disposed within remote network management platform 320.

The multi-instance architecture of remote network management platform 320 is in contrast to conventional multi-tenant architectures, over which multi-instance architectures exhibit several advantages. In multi-tenant architectures, data from different customers (e.g., enterprises) are comingled in a single database. While these customers' data are separate from one another, the separation is enforced by the software that operates the single database. As a consequence, a security breach in this system may affect all customers' data, creating additional risk, especially for entities subject to governmental, healthcare, and/or financial regulation. Furthermore, any database operations that affect one customer will likely affect all customers sharing that database. Thus, if there is an outage due to hardware or software errors, this outage affects all such customers. Likewise, if the database is to be upgraded to meet the needs of one customer, it will be unavailable to all customers during the upgrade process. Often, such maintenance windows will be long, due to the size of the shared database.

In contrast, the multi-instance architecture provides each customer with its own database in a dedicated computing instance. This prevents comingling of customer data, and allows each instance to be independently managed. For example, when one customer's instance experiences an outage due to errors or an upgrade, other computational instances are not impacted. Maintenance down time is limited because the database only contains one customer's data. Further, the simpler design of the multi-instance architecture allows redundant copies of each customer database and instance to be deployed in a geographically diverse fashion. This facilitates high availability, where the live version of the customer's instance can be moved when faults are detected or maintenance is being performed.

In some embodiments, remote network management platform 320 may include one or more central instances, controlled by the entity that operates this platform. Like a computational instance, a central instance may include some number of application and database nodes disposed upon some number of physical server devices or virtual machines. Such a central instance may serve as a repository for specific configurations of computational instances as well as data that can be shared amongst at least some of the computational instances. For instance, definitions of common security threats that could occur on the computational instances, software packages that are commonly discovered on the computational instances, and/or an application store for applications that can be deployed to the computational instances may reside in a central instance. Computational instances may communicate with central instances by way of well-defined interfaces in order to obtain this data.

In order to support multiple computational instances in an efficient fashion, remote network management platform 320 may implement a plurality of these instances on a single hardware platform. For example, when the aPaaS system is implemented on a server cluster such as server cluster 200, it may operate virtual machines that dedicate varying amounts of computational, storage, and communication resources to instances. But full virtualization of server cluster 200 might not be necessary, and other mechanisms may be used to separate instances. In some examples, each instance may have a dedicated account and one or more dedicated databases on server cluster 200. Alternatively, a computational instance such as computational instance 322 may span multiple physical devices.

In some cases, a single server cluster of remote network management platform 320 may support multiple independent enterprises. Furthermore, as described below, remote network management platform 320 may include multiple server clusters deployed in geographically diverse data centers in order to facilitate load balancing, redundancy, and/or high availability.

C. Public Cloud Networks

Public cloud networks 340 may be remote server devices (e.g., a plurality of server clusters such as server cluster 200) that can be used for outsourced computation, data storage, communication, and service hosting operations. These servers may be virtualized (i.e., the servers may be virtual machines). Examples of public cloud networks 340 may include AMAZON WEB SERVICES® and MICROSOFT® AZURE®. Like remote network management platform 320, multiple server clusters supporting public cloud networks 340 may be deployed at geographically diverse locations for purposes of load balancing, redundancy, and/or high availability.

Managed network 300 may use one or more of public cloud networks 340 to deploy applications and services to its clients and customers. For instance, if managed network 300 provides online music streaming services, public cloud networks 340 may store the music files and provide web interface and streaming capabilities. In this way, the enterprise of managed network 300 does not have to build and maintain its own servers for these operations.

Remote network management platform 320 may include modules that integrate with public cloud networks 340 to expose virtual machines and managed services therein to managed network 300. The modules may allow users to request virtual resources, discover allocated resources, and provide flexible reporting for public cloud networks 340. In order to establish this functionality, a user from managed network 300 might first establish an account with public cloud networks 340, and request a set of associated resources. Then, the user may enter the account information into the appropriate modules of remote network management platform 320. These modules may then automatically discover the manageable resources in the account, and also provide reports related to usage, performance, and billing.

D. Communication Support and Other Operations

Internet 350 may represent a portion of the global Internet. However, Internet 350 may alternatively represent a different type of network, such as a private wide-area or local-area packet-switched network.

Figure 4:
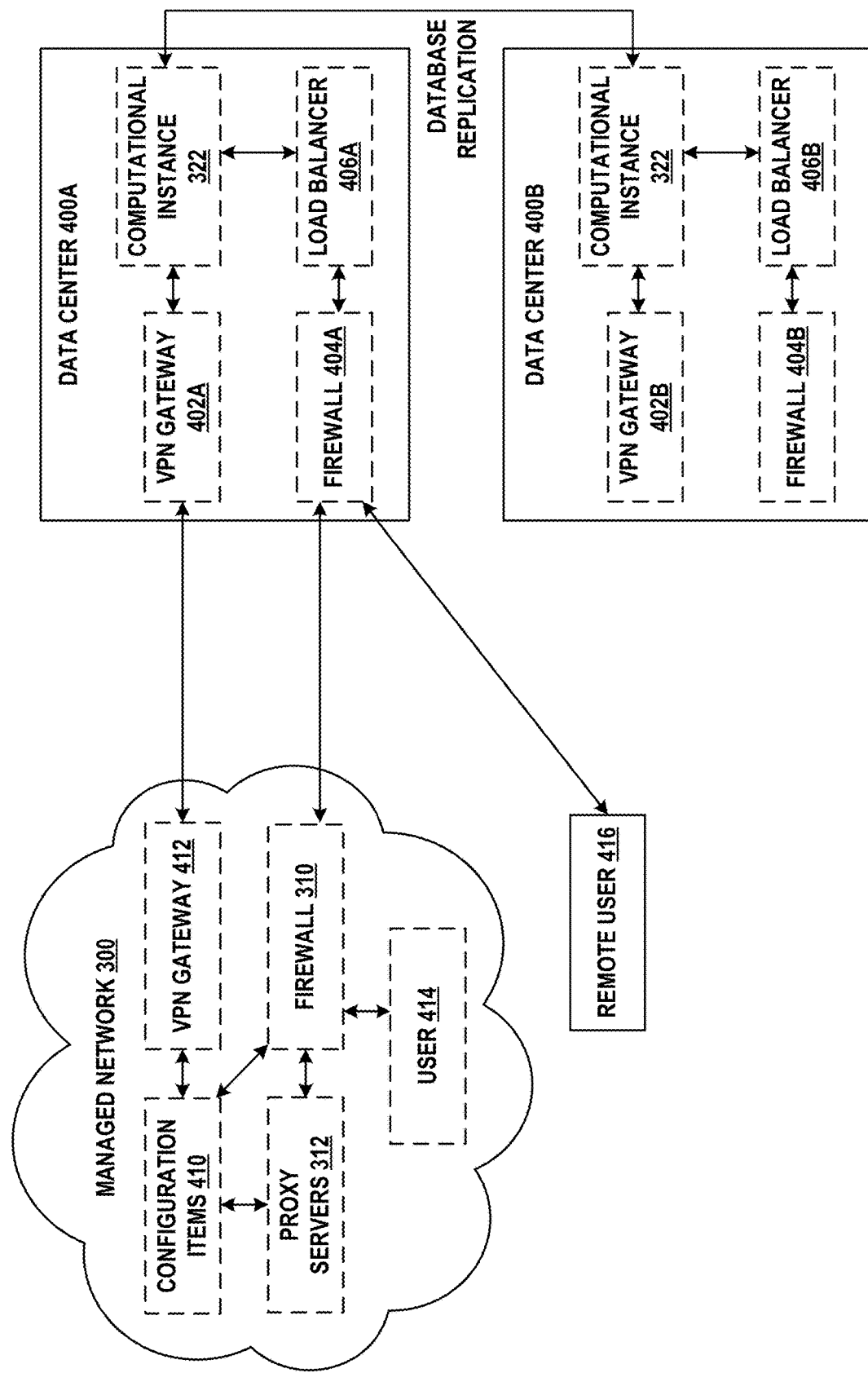
FIG. 4 depicts a communication environment involving a remote network management architecture, in accordance with example embodiments.

FIG. 4 further illustrates the communication environment between managed network 300 and computational instance 322, and introduces additional features and alternative embodiments. In FIG. 4, computational instance 322 is replicated, in whole or in part, across data centers 400A and 400B. These data centers may be geographically distant from one another, perhaps in different cities or different countries. Each data center includes support equipment that facilitates communication with managed network 300, as well as remote users.

In data center 400A, network traffic to and from external devices flows either through VPN gateway 402A or firewall 404A. VPN gateway 402A may be peered with VPN gateway 412 of managed network 300 by way of a security protocol such as Internet Protocol Security (IPSEC) or Transport Layer Security (TLS). Firewall 404A may be configured to allow access from authorized users, such as user 414 and remote user 416, and to deny access to unauthorized users. By way of firewall 404A, these users may access computational instance 322, and possibly other computational instances. Load balancer 406A may be used to distribute traffic amongst one or more physical or virtual server devices that host computational instance 322. Load balancer 406A may simplify user access by hiding the internal configuration of data center 400A, (e.g., computational instance 322) from client devices. For instance, if computational instance 322 includes multiple physical or virtual computing devices that share access to multiple databases, load balancer 406A may distribute network traffic and processing tasks across these computing devices and databases so that no one computing device or database is significantly busier than the others. In some embodiments, computational instance 322 may include VPN gateway 402A, firewall 404A, and load balancer 406A.

Data center 400B may include its own versions of the components in data center 400A. Thus, VPN gateway 402B, firewall 404B, and load balancer 406B may perform the same or similar operations as VPN gateway 402A, firewall 404A, and load balancer 406A, respectively. Further, by way of real-time or near-real-time database replication and/or other operations, computational instance 322 may exist simultaneously in data centers 400A and 400B.

Data centers 400A and 400B as shown in FIG. 4 may facilitate redundancy and high availability. In the configuration of FIG. 4, data center 400A is active and data center 400B is passive. Thus, data center 400A is serving all traffic to and from managed network 300, while the version of computational instance 322 in data center 400B is being updated in near-real-time. Other configurations, such as one in which both data centers are active, may be supported.

Should data center 400A fail in some fashion or otherwise become unavailable to users, data center 400B can take over as the active data center. For example, domain name system (DNS) servers that associate a domain name of computational instance 322 with one or more Internet Protocol (IP) addresses of data center 400A may re-associate the domain name with one or more IP addresses of data center 400B. After this re-association completes (which may take less than one second or several seconds), users may access computational instance 322 by way of data center 400B.

FIG. 4 also illustrates a possible configuration of managed network 300. As noted above, proxy servers 312 and user 414 may access computational instance 322 through firewall 310. Proxy servers 312 may also access configuration items 410. In FIG. 4, configuration items 410 may refer to any or all of client devices 302, server devices 304, routers 306, and virtual machines 308, any applications or services executing thereon, as well as relationships between devices, applications, and services. Thus, the term "configuration items" may be shorthand for any physical or virtual device, or any application or service remotely discoverable or managed by computational instance 322, or relationships between discovered devices, applications, and services. Configuration items may be represented in a configuration management database (CMDB) of computational instance 322.

As noted above, VPN gateway 412 may provide a dedicated VPN to VPN gateway 402A. Such a VPN may be helpful when there is a significant amount of traffic between managed network 300 and computational instance 322, or security policies otherwise suggest or require use of a VPN between these sites. In some embodiments, any device in managed network 300 and/or computational instance 322 that directly communicates via the VPN is assigned a public IP address. Other devices in managed network 300 and/or computational instance 322 may be assigned private IP addresses (e.g., IP addresses selected from the 10.0.0.0-10.255.255.255 or 192.168.0.0-192.168.255.255 ranges, represented in shorthand as subnets 10.0.0.0/8 and 192.168.0.0/16, respectively).

IV. Example Device, Application, and Service Discovery

In order for remote network management platform 320 to administer the devices, applications, and services of managed network 300, remote network management platform 320 may first determine what devices are present in managed network 300, the configurations and operational statuses of these devices, and the applications and services provided by the devices, as well as the relationships between discovered devices, applications, and services. As noted above, each device, application, service, and relationship may be referred to as a configuration item. The process of defining configuration items within managed network 300 is referred to as discovery, and may be facilitated at least in part by proxy servers 312.

For purposes of the embodiments herein, an "application" may refer to one or more processes, threads, programs, client modules, server modules, or any other software that executes on a device or group of devices. A "service" may refer to a high-level capability provided by multiple applications executing on one or more devices working in conjunction with one another. For example, a high-level web service may involve multiple web application server threads executing on one device and accessing information from a database application that executes on another device.

Figure 5A:
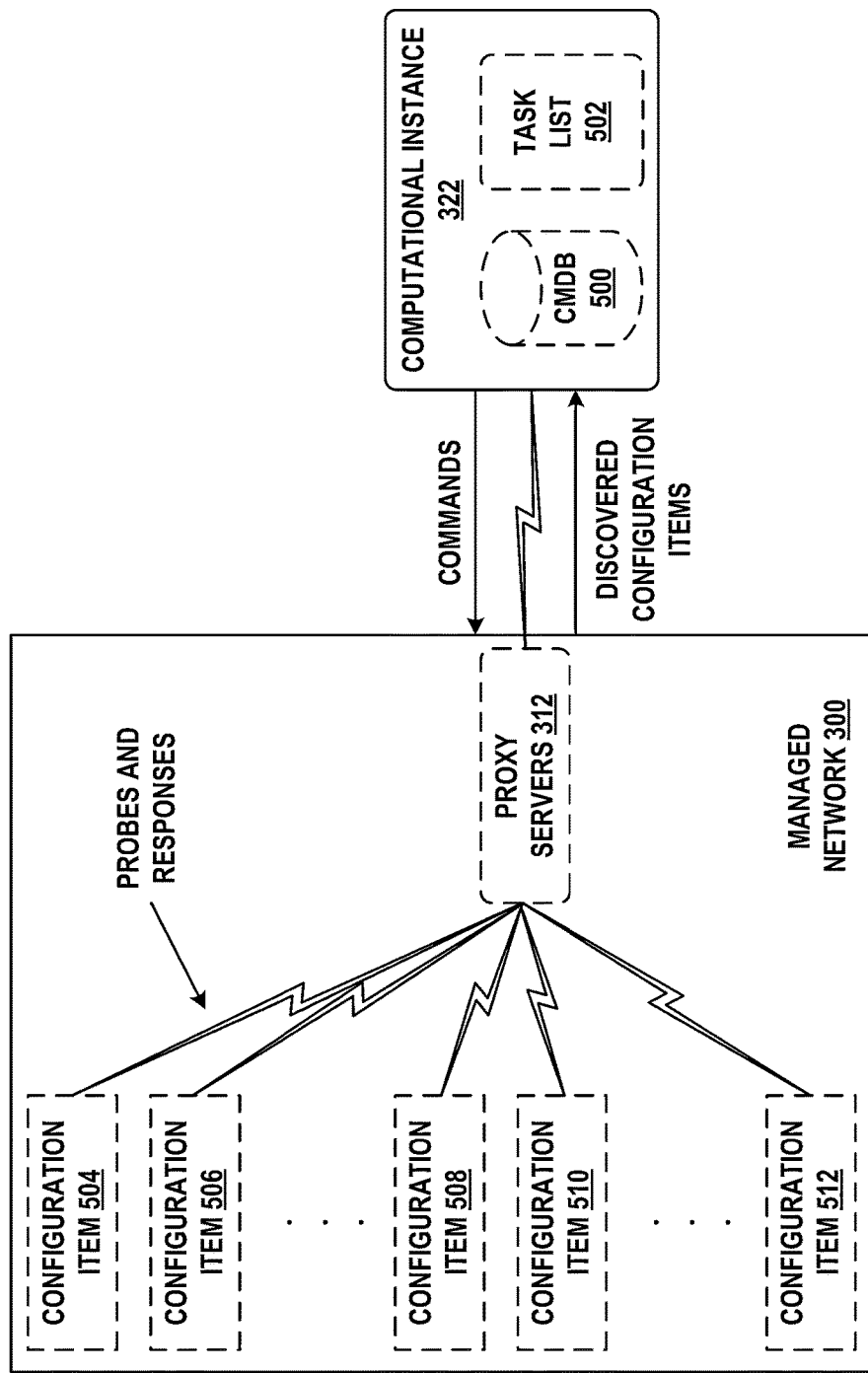
FIG. 5A depicts another communication environment involving a remote network management architecture, in accordance with example embodiments.

FIG. 5A provides a logical depiction of how configuration items can be discovered, as well as how information related to discovered configuration items can be stored. For sake of simplicity, remote network management platform 320, public cloud networks 340, and Internet 350 are not shown.

In FIG. 5A, CMDB 500 and task list 502 are stored within computational instance 322. Computational instance 322 may transmit discovery commands to proxy servers 312. In response, proxy servers 312 may transmit probes to various devices, applications, and services in managed network 300. These devices, applications, and services may transmit responses to proxy servers 312, and proxy servers 312 may then provide information regarding discovered configuration items to CMDB 500 for storage therein. Configuration items stored in CMDB 500 represent the environment of managed network 300.

Task list 502 represents a list of activities that proxy servers 312 are to perform on behalf of computational instance 322. As discovery takes place, task list 502 is populated. Proxy servers 312 repeatedly query task list 502, obtain the next task therein, and perform this task until task list 502 is empty or another stopping condition has been reached.

To facilitate discovery, proxy servers 312 may be configured with information regarding one or more subnets in managed network 300 that are reachable by way of proxy servers 312. For instance, proxy servers 312 may be given the IP address range 192.168.0/24 as a subnet. Then, computational instance 322 may store this information in CMDB 500 and place tasks in task list 502 for discovery of devices at each of these addresses.

FIG. 5A also depicts devices, applications, and services in managed network 300 as configuration items 504, 506, 508, 510, and 512. As noted above, these configuration items represent a set of physical and/or virtual devices (e.g., client devices, server devices, routers, or virtual machines), applications executing thereon (e.g., web servers, email servers, databases, or storage arrays), relationships therebetween, as well as services that involve multiple individual configuration items.

Placing the tasks in task list 502 may trigger or otherwise cause proxy servers 312 to begin discovery. Alternatively or additionally, discovery may be manually triggered or automatically triggered based on triggering events (e.g., discovery may automatically begin once per day at a particular time).

In general, discovery may proceed in four logical phases: scanning, classification, identification, and exploration. Each phase of discovery involves various types of probe messages being transmitted by proxy servers 312 to one or more devices in managed network 300. The responses to these probes may be received and processed by proxy servers 312, and representations thereof may be transmitted to CMDB 500. Thus, each phase can result in more configuration items being discovered and stored in CMDB 500.

In the scanning phase, proxy servers 312 may probe each IP address in the specified range of IP addresses for open Transmission Control Protocol (TCP) and/or User Datagram Protocol (UDP) ports to determine the general type of device. The presence of such open ports at an IP address may indicate that a particular application is operating on the device that is assigned the IP address, which in turn may identify the operating system used by the device. For example, if TCP port 135 is open, then the device is likely executing a WINDOWS® operating system. Similarly, if TCP port 22 is open, then the device is likely executing a UNIX® operating system, such as LINUX®. If UDP port 161 is open, then the device may be able to be further identified through the Simple Network Management Protocol (SNMP). Other possibilities exist. Once the presence of a device at a particular IP address and its open ports have been discovered, these configuration items are saved in CMDB 500.

In the classification phase, proxy servers 312 may further probe each discovered device to determine the version of its operating system. The probes used for a particular device are based on information gathered about the devices during the scanning phase. For example, if a device is found with TCP port 22 open, a set of UNIX®-specific probes may be used. Likewise, if a device is found with TCP port 135 open, a set of WINDOWS®-specific probes may be used. For either case, an appropriate set of tasks may be placed in task list 502 for proxy servers 312 to carry out. These tasks may result in proxy servers 312 logging on, or otherwise accessing information from the particular device. For instance, if TCP port 22 is open, proxy servers 312 may be instructed to initiate a Secure Shell (SSH) connection to the particular device and obtain information about the operating system thereon from particular locations in the file system. Based on this information, the operating system may be determined. As an example, a UNIX® device with TCP port 22 open may be classified as AIX®, HPUX, LINUX®, MACOS®, or SOLARIS®. This classification information may be stored as one or more configuration items in CMDB 500.

In the identification phase, proxy servers 312 may determine specific details about a classified device. The probes used during this phase may be based on information gathered about the particular devices during the classification phase. For example, if a device was classified as LINUX®, a set of LINUX®-specific probes may be used. Likewise, if a device was classified as WINDOWS® 2012, as a set of WINDOWS®-2012-specific probes may be used. As was the case for the classification phase, an appropriate set of tasks may be placed in task list 502 for proxy servers 312 to carry out. These tasks may result in proxy servers 312 reading information from the particular device, such as basic input/output system (BIOS) information, serial numbers, network interface information, media access control address(es) assigned to these network interface(s), IP address(es) used by the particular device and so on. This identification information may be stored as one or more configuration items in CMDB 500.

In the exploration phase, proxy servers 312 may determine further details about the operational state of a classified device. The probes used during this phase may be based on information gathered about the particular devices during the classification phase and/or the identification phase. Again, an appropriate set of tasks may be placed in task list 502 for proxy servers 312 to carry out. These tasks may result in proxy servers 312 reading additional information from the particular device, such as processor information, memory information, lists of running processes (applications), and so on. Once more, the discovered information may be stored as one or more configuration items in CMDB 500.

Running discovery on a network device, such as a router, may utilize SNMP. Instead of or in addition to determining a list of running processes or other application-related information, discovery may determine additional subnets known to the router and the operational state of the router's network interfaces (e.g., active, inactive, queue length, number of packets dropped, etc.). The IP addresses of the additional subnets may be candidates for further discovery procedures. Thus, discovery may progress iteratively or recursively.

Once discovery completes, a snapshot representation of each discovered device, application, and service is available in CMDB 500. For example, after discovery, operating system version, hardware configuration, and network configuration details for client devices, server devices, and routers in managed network 300, as well as applications executing thereon, may be stored. This collected information may be presented to a user in various ways to allow the user to view the hardware composition and operational status of devices, as well as the characteristics of services that span multiple devices and applications.

Furthermore, CMDB 500 may include entries regarding dependencies and relationships between configuration items. More specifically, an application that is executing on a particular server device, as well as the services that rely on this application, may be represented as such in CMDB 500. For example, suppose that a database application is executing on a server device, and that this database application is used by a new employee onboarding service as well as a payroll service. Thus, if the server device is taken out of operation for maintenance, it is clear that the employee onboarding service and payroll service will be impacted. Likewise, the dependencies and relationships between configuration items may be able to represent the services impacted when a particular router fails.

In general, dependencies and relationships between configuration items may be displayed on a web-based interface and represented in a hierarchical fashion. Thus, adding, changing, or removing such dependencies and relationships may be accomplished by way of this interface.

Furthermore, users from managed network 300 may develop workflows that allow certain coordinated activities to take place across multiple discovered devices. For instance, an IT workflow might allow the user to change the common administrator password to all discovered LINUX® devices in a single operation.

In order for discovery to take place in the manner described above, proxy servers 312, CMDB 500, and/or one or more credential stores may be configured with credentials for one or more of the devices to be discovered. Credentials may include any type of information needed in order to access the devices. These may include userid/password pairs, certificates, and so on. In some embodiments, these credentials may be stored in encrypted fields of CMDB 500. Proxy servers 312 may contain the decryption key for the credentials so that proxy servers 312 can use these credentials to log on to or otherwise access devices being discovered.

Figure 5B:
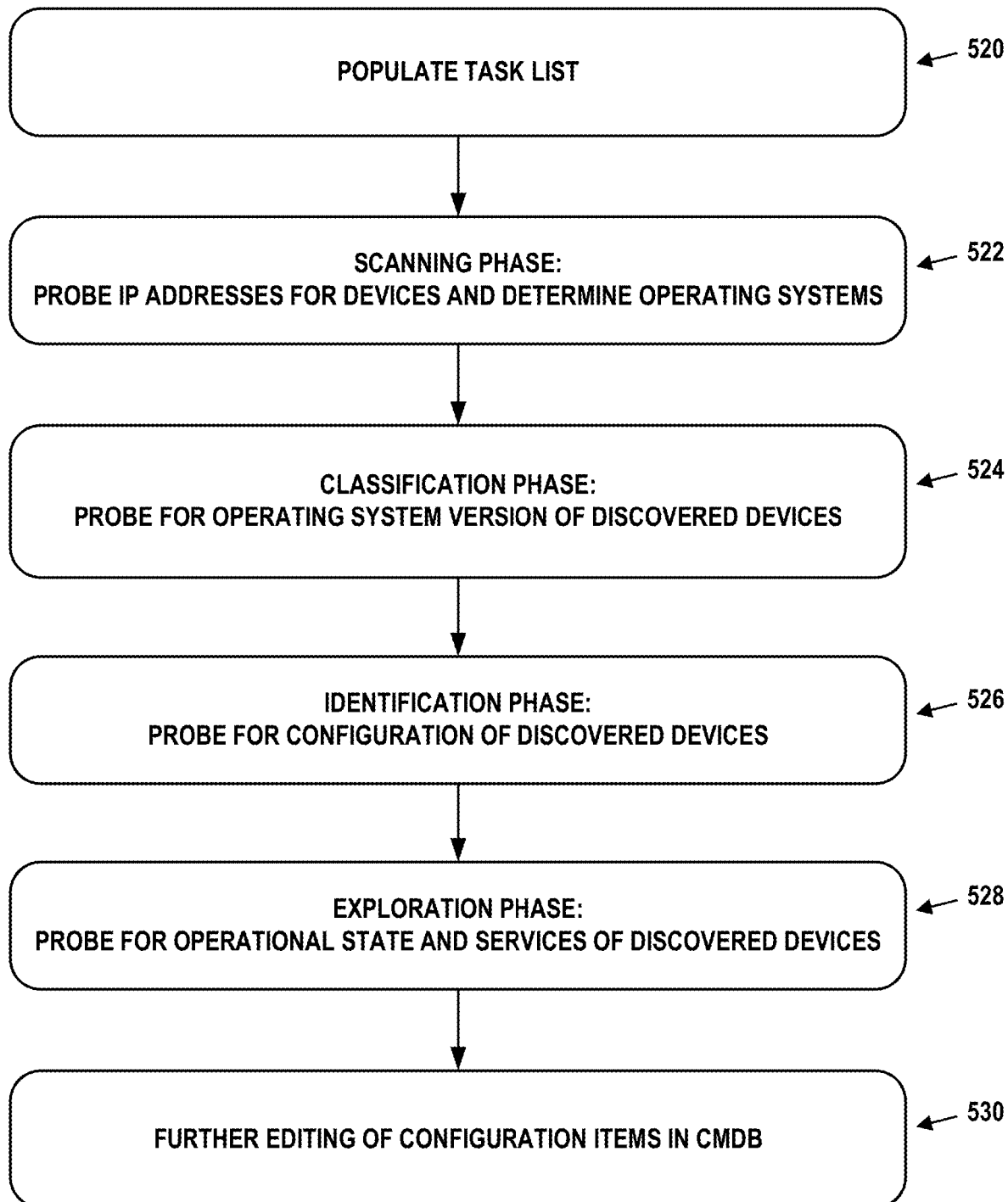
FIG. 5B is a flow chart, in accordance with example embodiments.

The discovery process is depicted as a flow chart in FIG. 5B. At block 520, the task list in the computational instance is populated, for instance, with a range of IP addresses. At block 522, the scanning phase takes place. Thus, the proxy servers probe the IP addresses for devices using these IP addresses, and attempt to determine the operating systems that are executing on these devices. At block 524, the classification phase takes place. The proxy servers attempt to determine the operating system version of the discovered devices. At block 526, the identification phase takes place. The proxy servers attempt to determine the hardware and/or software configuration of the discovered devices. At block 528, the exploration phase takes place. The proxy servers attempt to determine the operational state and applications executing on the discovered devices. At block 530, further editing of the configuration items representing the discovered devices and applications may take place. This editing may be automated and/or manual in nature.

The blocks represented in FIG. 5B are examples. Discovery may be a highly configurable procedure that can have more or fewer phases, and the operations of each phase may vary. In some cases, one or more phases may be customized, or may otherwise deviate from the exemplary descriptions above.

In this manner, a remote network management platform may discover and inventory the hardware, software, and services deployed on and provided by the managed network. As noted above, this data may be stored in a CMDB of the associated computational instance as configuration items. For example, individual hardware components (e.g., computing devices, virtual servers, databases, routers, etc.) may be represented as hardware configuration items, while the applications installed and/or executing thereon may be represented as software configuration items.

The relationship between a software configuration item installed or executing on a hardware configuration item may take various forms, such as "is hosted on", "runs on", or "depends on". Thus, a database application installed on a server device may have the relationship "is hosted on" with the server device to indicate that the database application is hosted on the server device. In some embodiments, the server device may have a reciprocal relationship of "used by" with the database application to indicate that the server device is used by the database application. These relationships may be automatically found using the discovery procedures described above, though it is possible to manually set relationships as well.

The relationship between a service and one or more software configuration items may also take various forms. As an example, a web service may include a web server software configuration item and a database application software configuration item, each installed on different hardware configuration items. The web service may have a "depends on" relationship with both of these software configuration items, while the software configuration items have a "used by" reciprocal relationship with the web service. Services might not be able to be fully determined by discovery procedures, and instead may rely on service mapping (e.g., probing configuration files and/or carrying out network traffic analysis to determine service level relationships between configuration items) and possibly some extent of manual configuration.

Regardless of how relationship information is obtained, it can be valuable for the operation of a managed network. Notably, IT personnel can quickly determine where certain software applications are deployed, and what configuration items make up a service. This allows for rapid pinpointing of root causes of service outages or degradation. For example, if two different services are suffering from slow response times, the CMDB can be queried (perhaps among other activities) to determine that the root cause is a database application that is used by both services having high processor utilization. Thus, IT personnel can address the database application rather than waste time considering the health and performance of other configuration items that make up the services.

V. CMDB Identification Rules and Reconciliation

A CMDB, such as CMDB 500, provides a repository of configuration items, and when properly provisioned, can take on a key role in higher-layer applications deployed within or involving a computational instance. These applications may relate to enterprise IT service management, operations management, asset management, configuration management, compliance, and so on.

For example, an IT service management application may use information in the CMDB to determine applications and services that may be impacted by a component (e.g., a server device) that has malfunctioned, crashed, or is heavily loaded. Likewise, an asset management application may use information in the CMDB to determine which hardware and/or software components are being used to support particular enterprise applications. As a consequence of the importance of the CMDB, it is desirable for the information stored therein to be accurate, consistent, and up to date.

A CMDB may be populated in various ways. As discussed above, a discovery procedure may automatically store information related to configuration items in the CMDB. However, a CMDB can also be populated, as a whole or in part, by manual entry, configuration files, and third-party data sources. Given that multiple data sources may be able to update the CMDB at any time, it is possible that one data source may overwrite entries of another data source. Also, two data sources may each create slightly different entries for the same configuration item, resulting in a CMDB containing duplicate data. When either of these occurrences takes place, they can cause the health and utility of the CMDB to be reduced.

In order to mitigate this situation, these data sources might not write configuration items directly to the CMDB. Instead, they may write to an identification and reconciliation application programming interface (API). This API may use a set of configurable identification rules that can be used to uniquely identify configuration items and determine whether and how they are written to the CMDB.

In general, an identification rule specifies a set of configuration item attributes that can be used for this unique identification. Identification rules may also have priorities so that rules with higher priorities are considered before rules with lower priorities. Additionally, a rule may be independent, in that the rule identifies configuration items independently of other configuration items. Alternatively, the rule may be dependent, in that the rule first uses a metadata rule to identify a dependent configuration item.

Metadata rules describe which other configuration items are contained within a particular configuration item, or the host on which a particular configuration item is deployed. For example, a network directory service configuration item may contain a domain controller configuration item, while a web server application configuration item may be hosted on a server device configuration item.

A goal of each identification rule is to use a combination of attributes that can unambiguously distinguish a configuration item from all other configuration items, and is expected not to change during the lifetime of the configuration item. Some possible attributes for an example server device may include serial number, location, operating system, operating system version, memory capacity, and so on. If a rule specifies attributes that do not uniquely identify the configuration item, then multiple components may be represented as the same configuration item in the CMDB. Also, if a rule specifies attributes that change for a particular configuration item, duplicate configuration items may be created.

Thus, when a data source provides information regarding a configuration item to the identification and reconciliation API, the API may attempt to match the information with one or more rules. If a match is found, the configuration item is written to the CMDB. If a match is not found, the configuration item may be held for further analysis.

Configuration item reconciliation procedures may be used to ensure that only authoritative data sources are allowed to overwrite configuration item data in the CMDB. This reconciliation may also be rules-based. For instance, a reconciliation rule may specify that a particular data source is authoritative for a particular configuration item type and set of attributes. Then, the identification and reconciliation API will only permit this authoritative data source to write to the particular configuration item, and writes from unauthorized data sources may be prevented. Thus, the authorized data source becomes the single source of truth regarding the particular configuration item. In some cases, an unauthorized data source may be allowed to write to a configuration item if it is creating the configuration item or the attributes to which it is writing are empty.

Additionally, multiple data sources may be authoritative for the same configuration item or attributes thereof. To avoid ambiguities, these data sources may be assigned precedences that are taken into account during the writing of configuration items. For example, a secondary authorized data source may be able to write to a configuration item's attribute until a primary authorized data source writes to this attribute. Afterward, further writes to the attribute by the secondary authorized data source may be prevented.

In some cases, duplicate configuration items may be automatically detected by reconciliation procedures or in another fashion. These configuration items may be flagged for manual de-duplication.

VI. Example Workflow and Server-Side Process Data Mining

As noted above, workflows can be automated or semi-automated multi-step processes that occur between any combination of people and computing systems. A given organization can routinely use a large number of workflows for various purposes, such as HR onboarding, expense approvals, and IT incident management just to name a few.

Workflows may be defined by way of remote network management platform 320 as state diagrams. Thus, each workflow may have a number of states and transitions therebetween. Certain automated actions may be performed in various states, such as setting values, executing a script, sending a notification, starting or stopping a timer, communicating with third-party remote servers, transitioning to a different state, and so on. Other actions may be triggered by state transitions. Some of these actions may involve waiting for user input, while others could be automated.

These workflows may be executed by a computational instance (e.g., computational instance 322 of remote network management platform 320). Thus, users may interact with workflows by way of one or more user interfaces of the computational instance. This may involve a user being notified by the computational instance (e.g., via email) that their input is needed for a particular work item that is in a particular state of a workflow. The user can then log on to the computational instance and enter the requested input through an appropriate user interface. In some cases, the user may also be able to view other parts of the workflow related to the work item, e.g., its values or actions from other states and/or a representation of its history.

Figure 6:
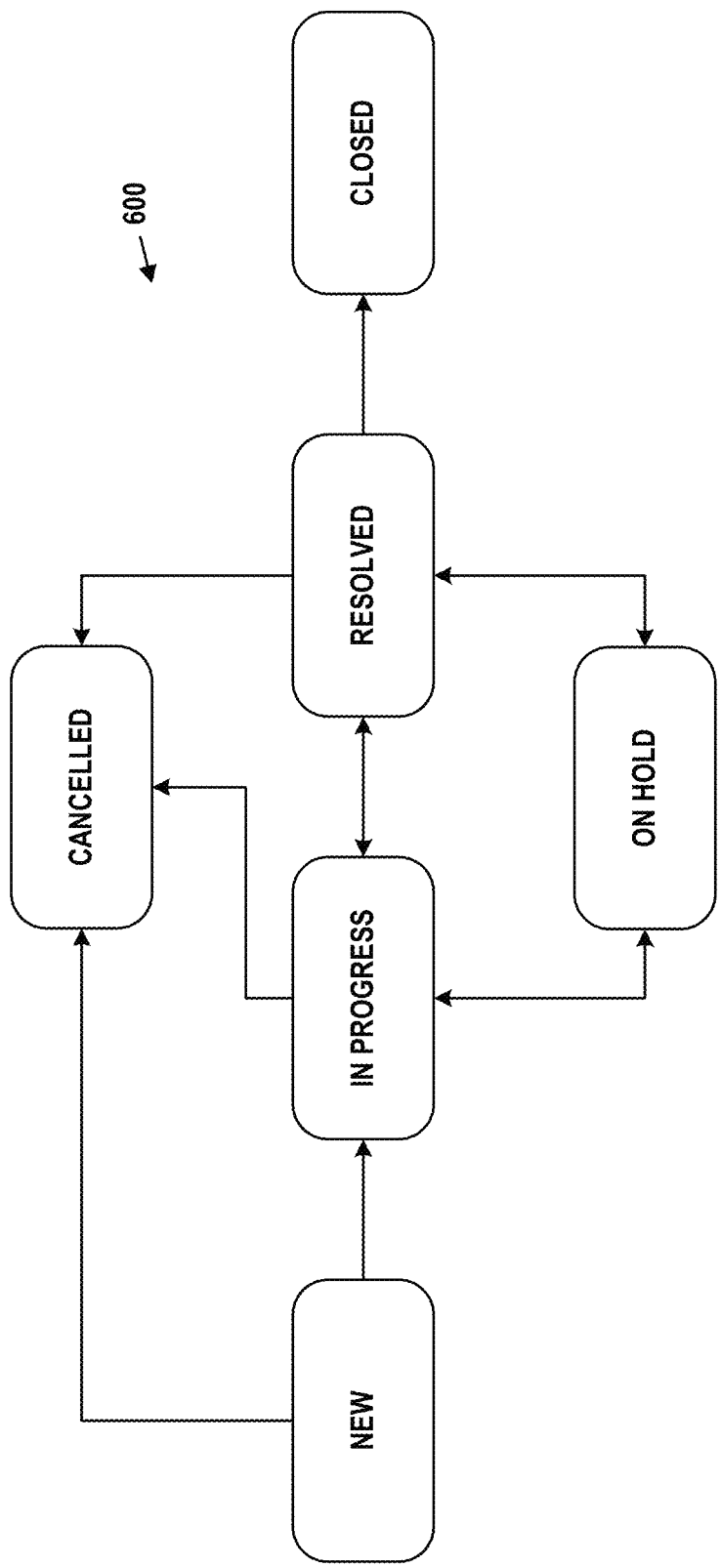
FIG. 6 depicts an example workflow, in accordance with example embodiments.

FIG. 6 depicts an example workflow 600, in which the boxes represent discrete states and the arrows between these states represent transitions. This workflow represents that of an IT incident. Such an incident may be created by a technology user who has encountered a problem (e.g., an application not working properly on their laptop, a network service that is not reachable) or automatically generated when an outage is detected. Each incident may progress through this workflow from the new state to either the cancelled state or the closed state. The incident may be assigned to an agent who is tasked with addressing the incident.

The states can be defined as follows. In the new state, the incident has been created but not yet investigated. In the in progress state, the incident has been assigned to an agent, and is being investigated or is scheduled for investigation. In the on hold state, the responsibility for the incident shifts temporarily from the assigned to another entity (e.g., the user or another agent) to provide further information, evidence, or a resolution. In the resolved state, the incident has been addressed by the agent. In the closed state, the incident has been confirmed to be satisfactorily resolved. In the cancelled state, the incident was triaged but found to be a duplicate incident, an unnecessary incident, or not representing an actual problem.

Workflow 600 is just one possible incident management workflow. Other such workflows involving more or few states and/or transitions may be possible. Workflow 600 also serves to represent more complicated workflows that go beyond just incident management.

Data related to each work item that is processed by a workflow may be logged, saved, or otherwise stored by the computational instance hosting the workflow. For example, data related to the states and transitions used by each work item, how much time each work item stays in each state, the user or users associated with each work item, and so on may be written to one or more logs. These logs may exist as files in a filesystem, entries in a database, or in some other form.

Such logs can later be mined for information regarding how the workflow is carried out in practice. This data mining can be used to identify bottlenecks and other inefficiencies in a workflow that are areas in which improvements to the workflow could possibly be made. For example, scripts on the computational instance could be automatically executed on demand or periodically to process the logs and output a representation of operational aspects of the workflow and/or one or more of its inefficiencies.

Figure 7:
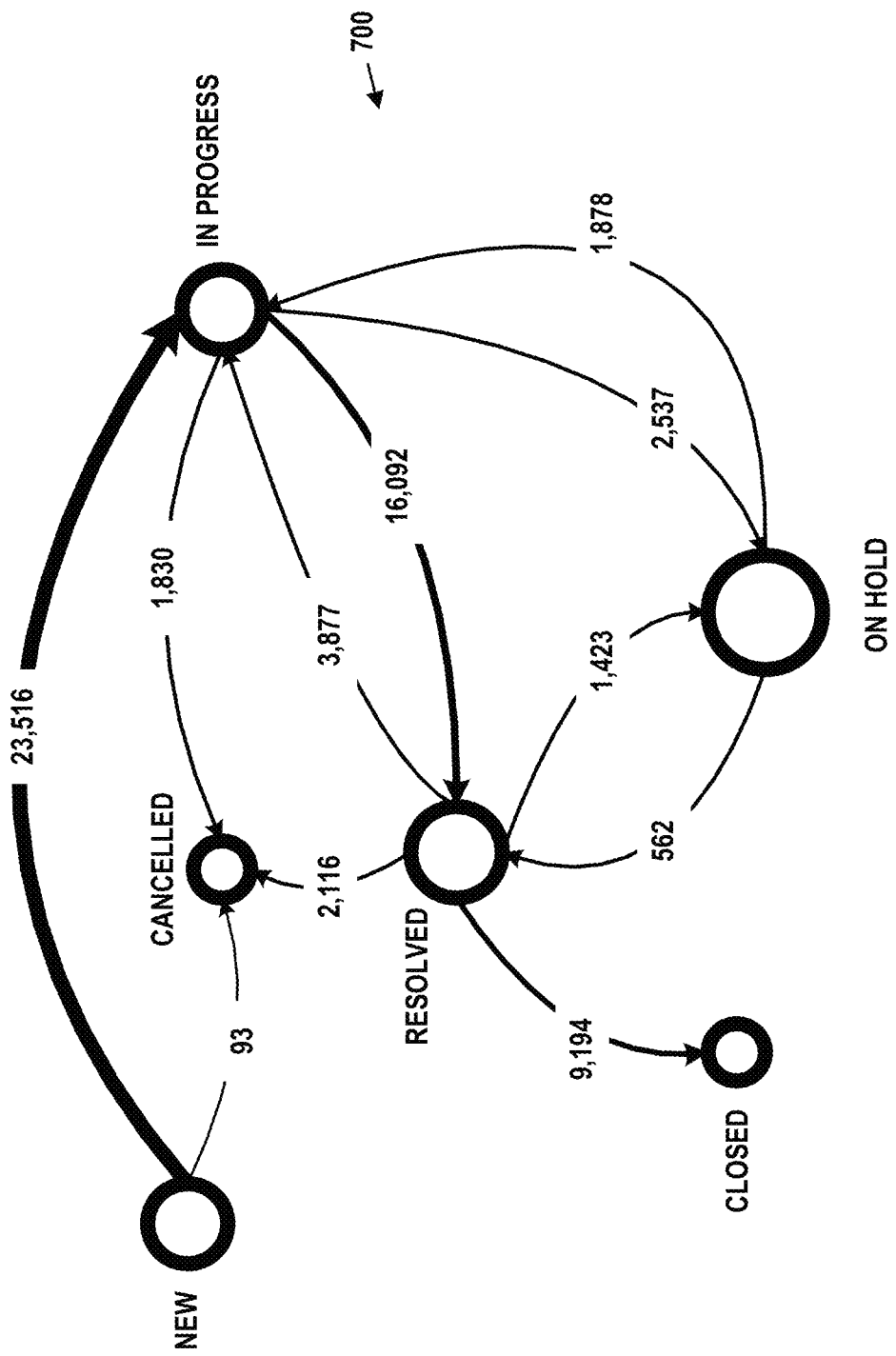
FIG. 7 depicts a state occupancy diagram, in accordance with example embodiments.

To that point, FIG. 7 depicts state-occupancy diagram 700 for example executions of workflow 600. A state-occupancy analysis of a workflow may be carried out by the computational instance in response to a request from a user, such as a process analyst. The computational instance may parse the logs for the workflow, select a plurality of entries, and determine a historical distribution of work items among states of the workflow. The distribution may also account for transitions between states, thereby enabling transition rates between states to be derived.

The computational instance may generate a graphical representation of this distribution, such as that of state-occupancy diagram 700, and then transmit the generated graphical representation to a computing device of the requesting user. With this visual information, the user may troubleshoot the incident management workflow, and/or to explore possible improvements to the workflow, for example.

In state-occupancy diagram 700, each state is represented graphically as a circle corresponding to a node. The size of each node may correspond to the occupancy of the associated state (e.g., the number of work items in each state). Transitions between states are shown as directed arrows, where the thickness of the each arrow's line corresponds to the number of transitions. The number of transitions is also indicated for each arrow. In state-occupancy diagram 700, the on hold state appears to have the largest occupancy, and the largest number of transitions is from the new state to the in progress state.

The occupancy of states and numbers of particular state transitions may be determined by a statistical analysis involving time-averaging over states and over specified time windows. Transition rates may also be derived from the numbers of transitions and the specified time windows.

A process analyst or other entity may inspect the data in the logs representing state occupancy, or the visual representation of state-occupancy diagram 700 to determine workflow inefficiencies. Example inefficiencies may include a large number of work items in a particular state (e.g., the on hold state of state-occupancy diagram 700 being heavily occupied), transitions representing a longer path taken through state-occupancy diagram 700 for a large number of work items, or work items "ping-ponging" in a cycle of two or more states. In some cases, the user interface presented may allow drilling down into the raw data from the logs and/or determining other factors associated with a workflow (e.g., the agents assigned to the largest number of incidents in the on hold state).

From the logs and/or state-occupancy diagram 700, process improvement recommendations can be made. Such recommendations may include suggestions of workflow states or transitions that can be automated, workflow states or transitions that can be removed, agents who could benefit from training, new software tools that could be employed to improve the workflow, and so on.

Nonetheless, process data mining from the server-side, while useful, only provides a high-level view of aggregate agent behavior. For instance, the log analysis discussed above for incidents may determine that certain agents tend to be much slower than others at resolving incidents. But this data cannot answer the question of why this is the case. It could be that these slower agents are assigned more difficult incidents, have less experience, lack training, or are more methodical.

More relevant and effective workflow improvements can be made if an understanding of agent behavior is available. Such an understanding can be achieved by performing process data mining not only in the server-side (i.e., on the computational instance), but also on the client-side (e.g., an agent's client device).

VII. Client-Side Data Collection Framework

A client-side collector may be a software application configured to run as an operating system service or in the background on endpoint devices employed by workflow users (e.g., laptop computers, desktop computers, tablets, etc.). Further, a client-side collector may be in communication with a proxy server, such as proxy server 312. For instance, a client-side collector may be configured to establish a communication session (e.g., a WebSocket or some other form of two-way communication) with a proxy server upon initiation. From time to time, the client-side collector may be triggered to execute and collect information regarding its endpoint device. These triggers may be requests received from the proxy server by way of the communication session, based on expiry of a timer on the endpoint device, caused by the agent, or they may take some other form. The acts of collecting information on the endpoint device and reporting it to a proxy server may be decoupled (e.g., the information may be collected and stored, then later reported).

When it is triggered, the client-side collector may execute one or more commands and/or read one or more parameters or settings of the endpoint device. For example, the client-side collector may issue commands by way of a command line interface (CLI), read configuration or operational parameters from a database, registry, and/or file system, and so on. Using these techniques, the client-side collector may gather information related to configuration and/or utilization of processor, memory, and storage resources, lists of installed and/or executing software applications, and/or screen captures of these software applications, just to name a few possibilities.

This information collected by a client-side collector may be sent to a server device, where it may be combined with server-side logs. Based on client-side logs that contain client-side information and the server-side logs, various actions that can be taken to improve the workflows may be deduced. Doing so allows for a much more detailed understanding of the client-side activities that were performed to resolve specific incidents, as well as associating the client-side activities with the server-side logs. A summary containing this information (e.g., averages, outliers, etc.) may then facilitate workflow improvements.

A. Architecture

Figure 8:
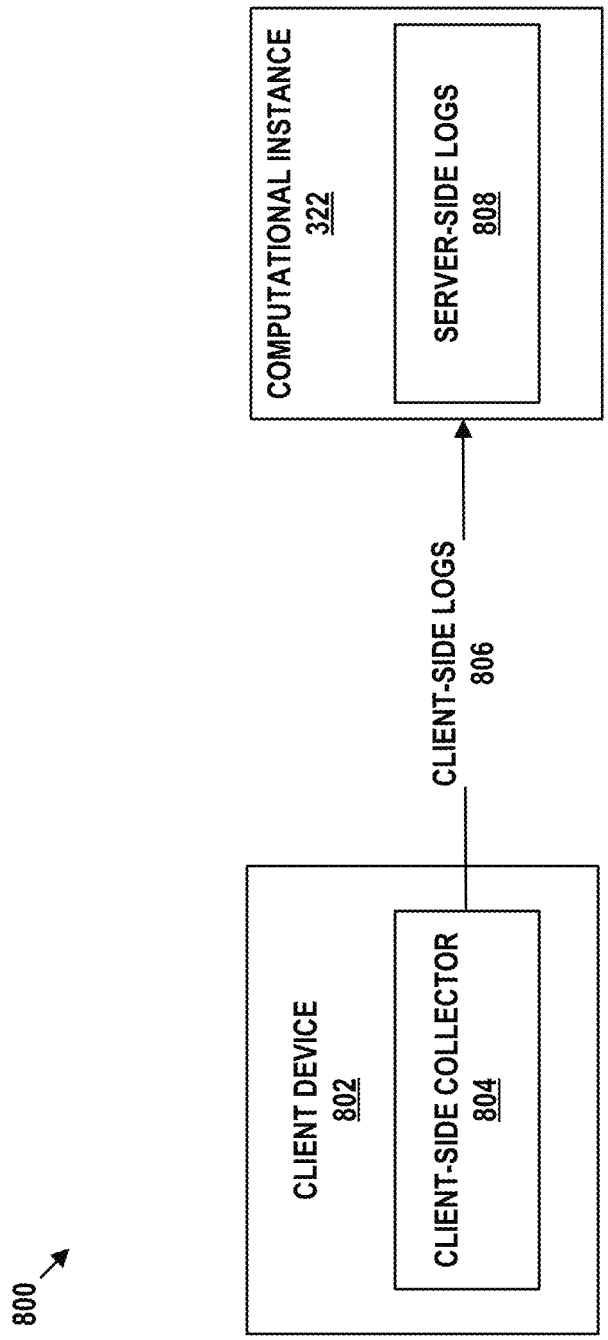
FIG. 8 depicts an architecture to facilitate workflow improvements, in accordance with example embodiments.

FIG. 8 depicts architecture 800 to facilitate workflow improvements. As shown in architecture 800, computational instance 322 and client device 802 may be in communication with one another. Architecture 800 is just one example of how workflow improvements can be facilitated. Other possible architectures exist.

Client device 802 may contain client-side collector 804. Client-side collector 804 may collect and store data about the operations of client device 802, including obtaining and analyzing various information available on the display of client device 802, intercepting client-side event messages of client device 802, gathering information on client device 802, or a combination thereof. Client-side logs 806 may then be sent to computational instance 322. Computational instance 322 may process this information and then store it, e.g., in a file or a database. Computational instance 322 may have already collected and stored server-side logs 808, or server-side logs 808 may be generates or updated after client-side logs 806 are received.

In some cases, client-side collector 804 may collect data that is later post-processed. For example, screen captures collected from client device 802 may undergo post-processing to extract text and/or other information therefrom. The post-processing may be done using client device 802 or using computational instance 322. In the case wherein the post-processing is done by client device 802, client-side logs 806 may include the results of this post-processing, such as information extracted from the screen captures (but preferably not the screen captures themselves). In the case where post-processing is done on computational instance 322, the client-side collector 804 may send the screen captures to computational instance 322 as part of client-side logs 806. Additionally or alternatively, the post-processing may be done on a computing device that is not client device 802 or computational instance 322, in which case client device 802 or computational instance 322 may transmit client-side logs 806 (e.g., the screen captures) to this device and receive the analyzed data (e.g., the text extracted from the screen captures) from this device.

As described above, computational instance 322 may have access to one or more databases, which may receive client-side logs 806 and integrate them with server-side logs 808 to provide a more complete representation of the activities involved in each state of a workflow. From this integrated data, computational instance 322 may determine one or more actions that can be taken to improve the efficacy of the workflow. To that end, computational instance 322 may compute various statistical measures on the integrated data, such as averages, standard deviations, medians, interquartile ranges, distributions of values, and other measures that may facilitate determining workflow inefficiencies. Further, computational instance 322 may execute scripts to produce graphics that facilitate identifying workflow inefficiencies and/or execute other scripts to intelligently analyze the workflow-performance statistics and identify workflow inefficiencies.

Additionally, communication between client device 802 and computational instance 322 may be bidirectional. For example, to start client-side collector 804 (e.g., to start performance of screen captures of client device 802), computational instance 322 may send a message to client device 802. Likewise, to pause or stop client-side collector 804 (e.g., to halt the performance of screen captures of client device 802), computational instance 322 may send a message to client device 802. During or after collection, client device 802 (or client-side collector 804) may send client-side logs 806 to computational instance 322.

As mentioned above, client-side collector 804 may collect information from client device 802, but processing of the information may occur on either client device 802, computational instance 322 (or other server), or a combination thereof. There are advantages and disadvantages associated with each, and the actual implementation in this regard may vary. For example, an advantage of processing information locally on client device 802 may be that the raw data of screen captures and other collected information are not transmitted to another device, thereby protecting privacy of the agent using client device 802 and reducing the amount of data transmitted between client device 802 and computational instance 322.

On the other hand, processing the information on computational instance 322 (or other server) may allow for the data processing tasks to be centralized at a potentially more powerful computer, thereby facilitating faster computation times. Data processing may also be split between client device 802 and computational instance 322 (or other server), for example, so that more compute-intensive tasks occur on the servers and other data processing tasks occur on client device 802 to protect agent privacy.

Architecture 800 may take other forms. For example, architecture 800 could include multiple client devices, each with a client-side collector that collects and sends client-side logs to computational instance 322. Additional arrangements are also possible.

B. Capture and Processing of Client-Side Information

Through executing commands, client-side collector 804 may collect information on the operations of client device 802. This information may include obtaining and analyzing various data available on the display of client device 802, intercepting client-side event messages (e.g., application state changes, keyboard or mouse input events, etc.) of client device 802, gathering data stored on client device 802, or a combination thereof. The following example illustration focuses on collecting information from screen captures on client device 802. Nonetheless, and as noted above, information may be collected from other sources on client device 802.

Figure 9A:
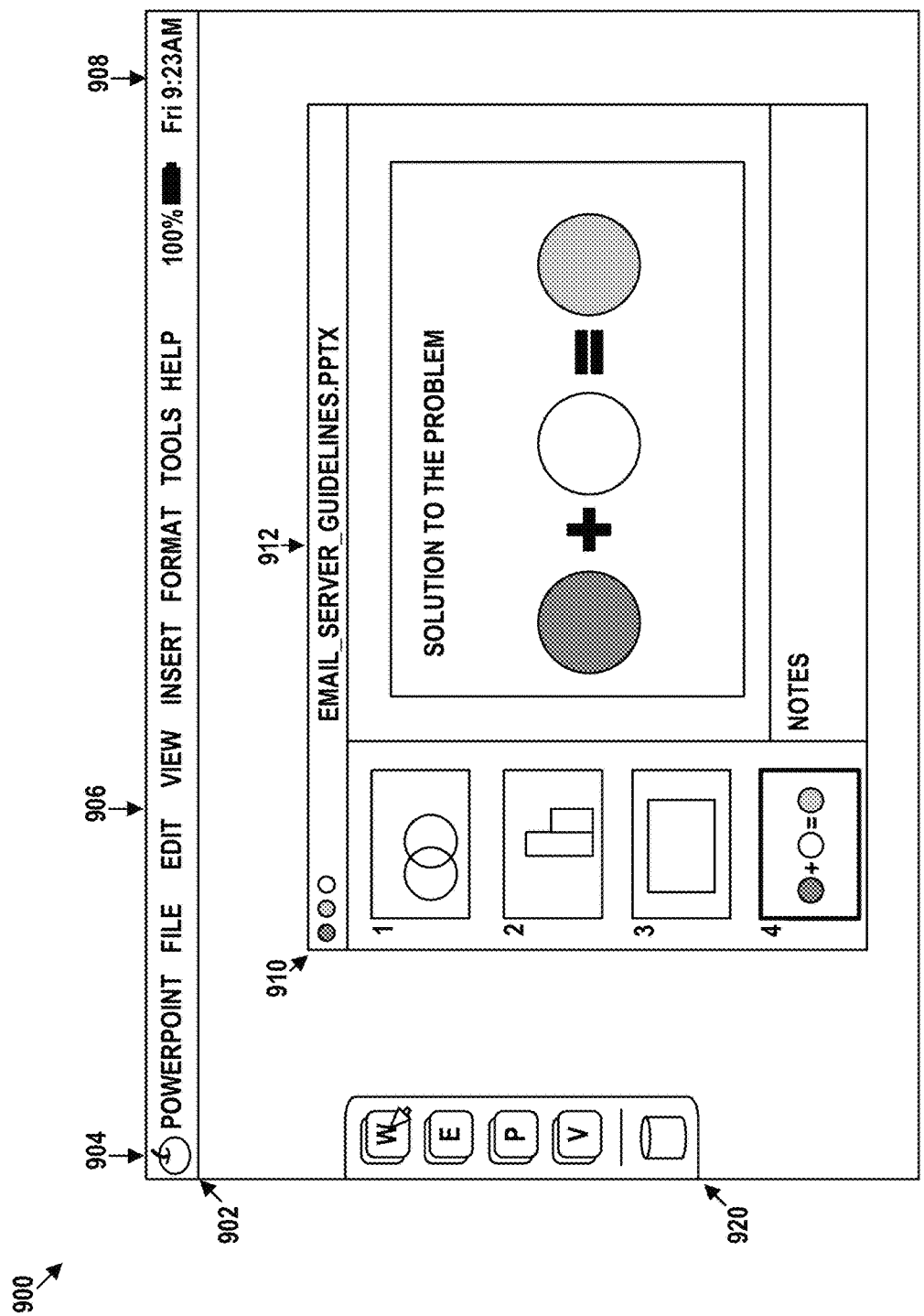
FIG. 9A depicts a display, in accordance with example embodiments.
Figure 9B:
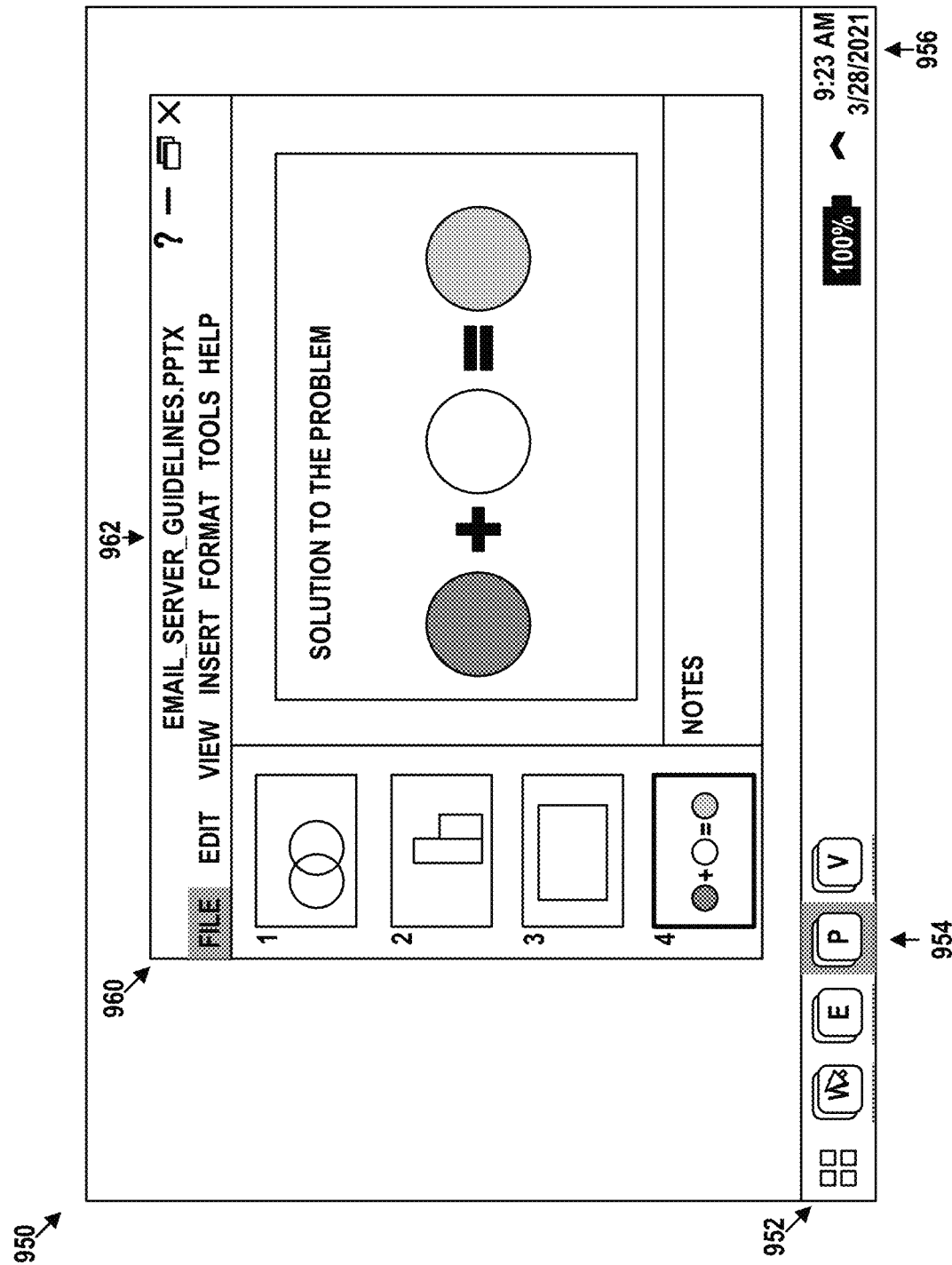
FIG. 9B depicts a further display, in accordance with example embodiments.

FIGS. 9A and 9B respectively depict example displays 900 and 950, from which client-side collector 804 may capture and/or collect information. Displays 900 and 950 may depict similar graphical user interfaces as arranged by different operating systems.

Display 900 is a representation of a graphical user interface that includes a menu bar 902 with logo 904, text items 906, and clock 908. Display 900 also includes an active window 910 depicting an application. Active window 910 includes text 912 in its title bar. Display 900 further includes an application selector menu 920 from which various applications (represented as single letters) can be selected. Once selected in this manner, an application will be launched and/or display 900 may be modified to show this application as the active window.

Display 950 is a representation of a graphical user interface that includes a task bar 952 with application selector menu 954 and clock 958. As was the case for display 900, various applications (represented as single letters) can be selected from application selector menu 954, and a selected application will be launched and/or display 950 may be modified to show this application as the active window. Display 950 also includes an active window 960 depicting an application. Active window 960 includes text 962 in its title bar.

While displays 900 and 950 provide largely the same information, they do so in different arrangements. As examples of the differences between displays 900 and 950, display 900 shows application selector menu 920 as a standalone item, while display 950 shows application selector menu 954 as part of task bar 952. Display 900 includes logo 904, while display 950 does not include such a logo. Display 900 places clock 908 in the upper right corner of its graphical user interface, while display 950 places clock 956 in the lower right corner of its graphical user interface. Other differences exist as well.

Nonetheless, in both of displays 900 and 950, there is enough information that can be processed to infer the activities being taken by an agent viewing and/or interacting with these displays. Thus, screen captures of such displays can be taken to obtain this information.

Screen captures may be triggered programmatically, for example by way of system calls in software applications that are executing on client device 802. A screen capture may make a copy of the display presented on a graphical user interface, and store this copy to a local file in a graphics format (e.g., as a bitmap, JPG, or PNG file). In some cases, screen captures may capture all of the pixels displayed, and in others a screen capture may capture a subset thereof (e.g., pixels within a particular rectangular bounding box or associated with a particular window displayed on the graphical user interface). Further, client-side collector 804 may be configured or triggered to automatically perform screen captures at some rate (e.g., once per every 5, 10, 20, 30, or 60 seconds) and/or a specific number of times.

Regardless, once a screen capture is stored, its graphical data may be analyzed. Such analysis may utilize the following process: determine the operating system on which the screen capture was taken (e.g., of client device 802), identify the active application in the screen capture, and identify how the active application is being used. However, other processes may be used.

Determining the operating system may occur in various ways. Standard discovery probes may be able to determine the operating system from open TCP/UDP ports, locations of files, and content of files, reading configuration information, and so on. Alternatively, when this information is not available or not easily available, the operating system may be determined from text and/or graphics within the screen capture.

For example, the arrangement of information in a screen capture of display 900 may be used to determine that the operating system is MACOS®. For instance, the position and/or presence of logo 904 may be enough make this determination. Likewise, the arrangement of information in a screen capture of display 950 can be used to determine that the operating system is WINDOWS®. For example, the presence of task bar 952 with selector menu 954 and clock 956 may be enough to make this determination. In either case, operating system identification may involve sliding a filter across various parts of a screen capture, by way of a convolutional neural network trained to identify certain types of operating systems from screen captures, or through some other mechanism.

After having identified the operating system, client side collector 804 may locate the active window within a screen capture. For example, client side collector 804 may analyze these screen captures for a rectangular box with four corners shown, a window with a slightly different border color than non-active corners, and/or other characteristics indicative of an active window. In some cases, procedures for identifying the active window may depend on the identified operating system, as some operating system graphical user interfaces may display active windows with different types of borders, colors, or shading. As an alternative to analyzing a screen capture, an operating system event message or log may be read to identify the active window, should the operating system support such procedures.

Further, client side collector 804 may identify the application in the active window. For example, screen captures may be collected of the entire screen in part or as a whole, and client side collector 804 may analyze parts of the active application for identifying features. These features may include text patterns, logos, color and shading patterns, and so on. This process could be performed with or without having identified the operating system.

The client side collector 804 may also identify and collect other relevant data displayed in the screen captures. For example, client side collector 804 may obtain a screen capture of display 900 in its entirety or in part and analyze this screen capture for useful information. In some implementations, client side collector 804 may use optical character recognition (OCR) and scripts to obtain a representation of data being displayed by the active application.

For example, scripts may analyze the screen capture of display 900 for areas of interest, e.g., text 906 and text 912). These areas of interest may serve as inputs to an OCR engine. To that point, the text "POWERPOINT" may be obtained from text 906, and the text "EMAIL_SERVER_POWERPOINT.PPTX" may be obtained from text 912. This would identify the active application as MICROSOFT® POWERPOINT® and the name of the file shown as "EMAIL_SERVER_POWERPOINT.PPTX". Then the content of active window 910 may be further analyzed to determine aspects of the document that the agent is viewing.

In addition to information obtained from screen captures, other information on the operations of client device 902 may also be collected. For instance, client side collector 804 may listen for client-side event messages. These client-side event messages may indicate events occurring at client device 902, such as left and/or right mouse-clicks and the screen coordinates thereof. For example, client-side collector 804 may detect the location of a mouse cursor (shown in FIGS. 9A and 9B) when the mouse is moved, idle or its buttons are actuated (clicked). Further, client-side collector 804 may detect keystrokes and log the specific letter, number, symbol, or character that was pressed. Other client-side event messages that may be collected include mouse hovering, mouse-scrolls, clicking away from or clicking onto a specific active window, and so on.

Further, client-side collector 804 may also gather operational data on executing applications and processes. For example, if client device 802 is executing presentation, word processing, and spreadsheet applications at the same time, operational data on the processor usage, memory usage, and network usage may be collected for each of those applications.

Regardless of how this information is collected, it may be associated with states or transitions in a workflow being carried out on computational instance. Such a workflow may have a unique identifier per work item, which may take the form of letters, numbers, symbols, filenames, title, manual tags, and so on. For example, an incident management workflow may involve an incident work item with a unique identifier of "INC0012345". A link between the workflow state and agent activities may be established through a variety of methods.

One way in which the link between the workflow state and agent activities may be established is by requesting that the agent specify the unique identifier by way of an application on the client device (e.g., a user interface of client-side collector 804) when they begin work on a particular work item. Then, any information collected on client device 802 will be associated with this unique identifier until the agent indicates that they are no longer working on that work item. The association is made explicit in client-side logs 806 so that computational instance 322 can later correlate events and information in client-side logs 806 relating to this unique identifier with events and information in server-side logs 808 that also related to the unique identifier.

Another way in which a link between the workflow state and agent activities may be established is through time-stamping information written to client-side logs 806 and server-side logs 808. For example, the agent may indicate when they begin and end a task through using an application, such as client-side collector 804. Alternatively or additionally, screen captures from client device 802 may be time-stamped, recording the times of their capture. Computational instance 322 may determine that certain information in client-side logs 806 is related to a particular unique identifier based on the timestamps associated with the client-side information indicating that it was being viewed or used by the agent when the work item with that unique identifier was being viewed or updated by the agent.

Another way in which the link between workflow state and agent activities may be established is by locating the unique identifier in an active window. In some cases, the unique identifier may be part of the URL for a particular website. When a web browser displaying the particular website is active, the unique identifier may be retrieved from a screen capture through OCR or other techniques described above. This unique identifier may be associated with activities occurring on the client device until another web page displaying a URL with another unique identifier is active. Another screen capture may capture the URL and use OCR to deduce the other unique identifier, and activities from that point forward may be associated with the other identifier.

The collected information from analyzing various data available on the display, intercepting client-side event messages, and gathering data stored on the device may be used in various ways. In particular, this collected client-side data may be useful to determine why a workflow or a state thereof takes a particular amount of time for a particular agent to complete, and actions that may be taken to improve the efficacy of the workflow.

For example, a first incident describing an email server issue may be assigned to a first agent and a second incident describing a similar incident may be assigned to a second agent. The first agent may take twenty minutes to mark the incident as resolved from in-progress, whereas it may take the second agent an hour before marking the in-progress incident as resolved.

From client side logs associated with activities of the first agent during the 20-monite time period, it may be determined that the first agent sent a few test emails, then logged on to the email server's administrative interface and changed some settings. From client side logs associated with activities of the second agent during the hour-long time period, it may be determined that the second agent reviewing a training presentation, searched the Internet, then logged on to the email server's administrative interface and changed some settings. The amount of time each agent spent on each of these activities (test emails, email server administrative interface, presentations, Internet searching) may be determined from the respective client-side logs.

When collecting information on a client device such as client device 802, agent privacy can be a concern. Accordingly, collection of the information might be done only with the authorization and knowledge of the agent. After such authorization is received, information collection may be periodic, event-driven, and/or specific to particular areas of the display. For example, client-side collector 804 may contain mechanisms (e.g., buttons on a small window displayed on the graphical user interface of client device 802) to allow and/or disallow information collection, as well as to allow and/or disallow information collection from a specific part of the display, specific applications, etc. When information is being collected, the display may have a red frame around the portion of the display being recorded or exhibit another indication that the user actions on the client-side device are being recorded.

Additionally or alternatively, screen captures of the display may be taken only when one or more events are detected (e.g., a mouse actuation, a keystroke, etc.). The detection of an event may indicate interactions that an agent is having with client device 802 and that the areas of the screen are expected to change. Thus, recording what happens after an event may facilitate collection of information while maintaining a reasonable amount of privacy.

Still alternatively or additionally, the information collection may be specific to particular areas of the display. For example, only activities that pertain to an active window (e.g., scrolling, or mouse actuations) may be recorded and/or only the current active window may be screen captured. Thus, if the agent is viewing a presentation, windows other than the presentation application (e.g., web browser, email, and messaging application windows) will not be captured.

Further, the information collection may be specific to an allowed list or a blocked list. An allowed list may specify one or more applications and/or one or more network addresses, and information collection may only occur with respect to the applications and/or network addresses listed in the allowed list. Conversely, a blocked list may specify one or more applications and/or one or more network addresses for which information collection may not occur. For example, if a web browser is open to a page where the network address is on the blocked list, client-side collector may identify this address (e.g., by way of OCR or other techniques discussed above) and refrain from including that information in client-side logs 806.

C. Workflow Improvements

As noted, computational instance 322 may integrate client-side logs 806 with server-side logs 808 to provide a comprehensive representation of agent activities when work items are in various states of a workflow. From these integrated logs, statistics may be generated and then used to drive workflow improvements.

FIG. 10 provides an example summary of workflow performance data that could be derived from integrated logs. Table 1000 contains workflow performance data for incidents (either of one type or of various types) in the "in progress" state (as indicated in column 1002). Each row in table 1000 may indicate a different combination of applications (as indicated in column 1004) that were employed by the agent while addressing the incident. For each of these combinations, their frequency (as indicated in column 1006), the average number of steps taken by the agent (as indicated in column 1008), and the average duration of time the agent spent taking these steps (as indicated in column 1010) can be considered. Here, steps may include the number of client-side and/or server-side events that took place while the incident was in the "in progress" state, where events may include client-side mouse actuations, keystrokes, switching between applications, and so on.

As an example of one type of improvement, computational instance 322 may determine the distribution of time that agents spend working on certain types of incidents in the "in progress" state. From this distribution, agents that are "outliers" in this distribution (e.g., taking more than the $90^{th}$ or $95^{th}$ percentile), may be identified. Based on the applications used by these agents and possibly how these applications are used, computational instance 322 may recommend that these agents obtain further training.

Alternatively, computational instance 322 may determine that such "outlier" agents do not have access to the proper software tools for diagnosing incidents, and may recommend that these agents are provided with additional software tools.

In some cases, the workflow itself may be identified as a problem, such as certain states in the workflow never being entered, rarely being entered, or being left shortly after being entered. In these cases, computational instance 322 may recommend that such states be removed from the workflow.

As another example, computational instance 322 may analyze the activities and identify that a large number (e.g., greater than a threshold percentage) of incidents are in the "on hold" state. This could indicate that these incidents are not being reevaluated in a timely fashion. Computational instance 322 may recommend that the process could be improved by automatically resetting incidents in the "on hold" state to be "in progress" after being "on hold" for a certain period of time.

Figure 11:
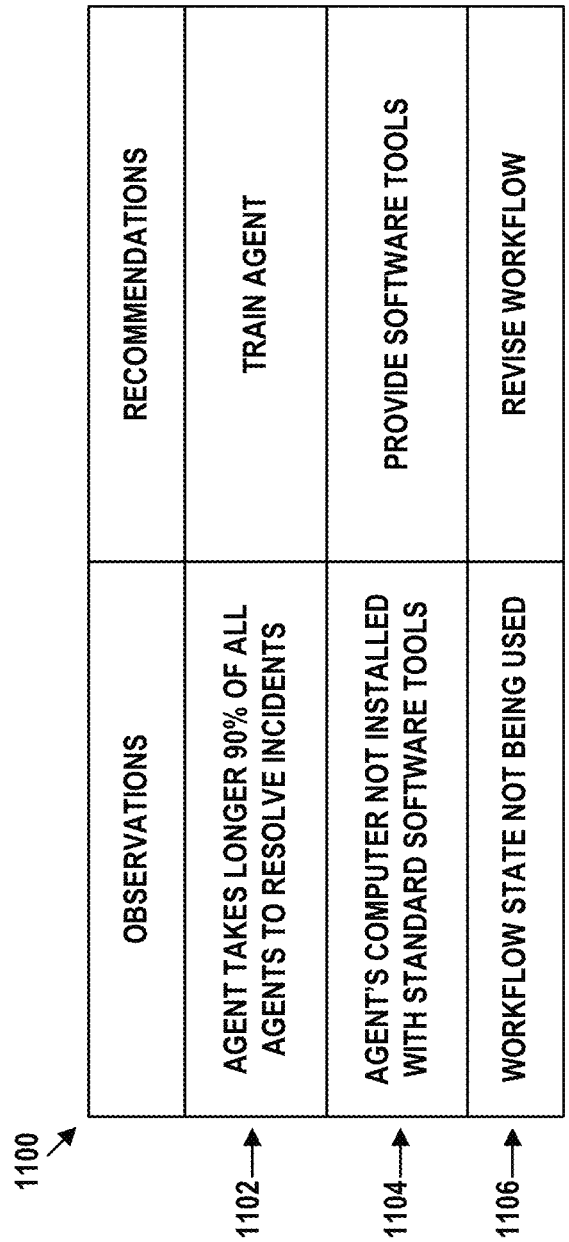
FIG. 11 depicts a further table, in accordance with example embodiments.

FIG. 11 provides table 1100 that maps observations made about workflow performance data to concrete recommendations for workflow improvement. In row 1102, the observation that an agent takes longer than 90% of all agents to resolve incidents may result in the recommendation to train that agent. In row 1104, the observation that an agent's computer is not installed with certain standard software tools (as determined from discovery-like probes) may result in the recommendation that the agent is provided with access to such tools. In tow 1106, the observation that a workflow state is not being used (or only not being used in a meaningful way) may result in the recommendation that the workflow be revised, possibly to eliminate this state. Other examples or recommendations to facilitate workflow improvements are also possible.

The embodiments described herein are unconventional because they make use of client-side data to improve server-side workflows. This client-side data was previously unavailable to server devices carrying out the workflows, and thus could not be taken into account when considering workflow improvements. In these embodiments, rich and detailed information regarding application use and procedures employed by agents can be used to more accurately identify and rectify workflow inefficiencies.

VIII. Example Operations

Figure 12:
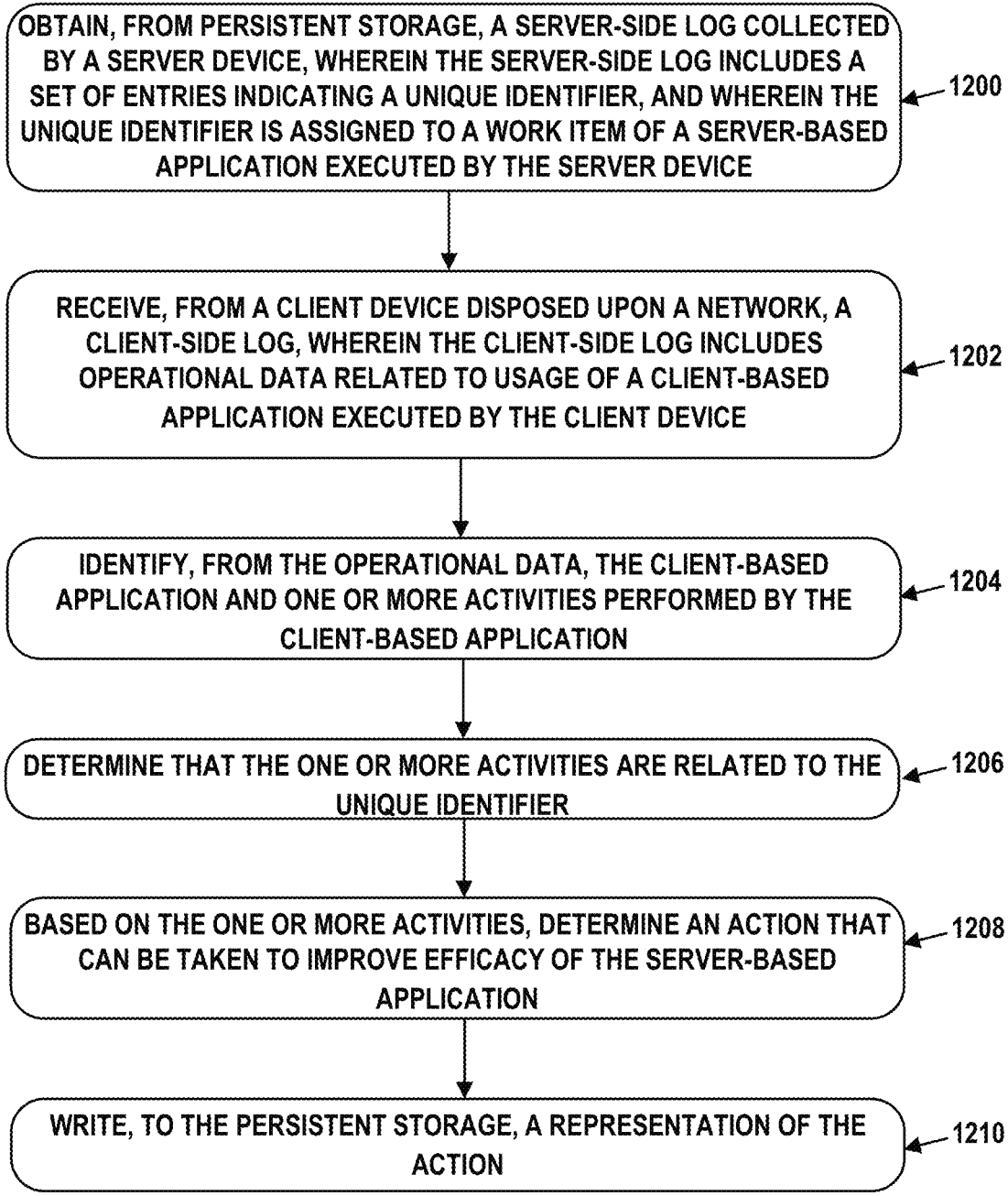
FIG. 12 is a flow chart, in accordance with example embodiments.

FIG. 12 is a flow chart illustrating an example embodiment. The process illustrated by FIG. 12 may be carried out by a computing device, such as computing device 100, and/or a cluster of computing devices, such as server cluster 200. However, the process can be carried out by other types of devices or device subsystems. For example, the process could be carried out by a computational instance of a remote network management platform or a portable computer, such as a laptop or a tablet device.

The embodiments of FIG. 12 may be simplified by the removal of any one or more of the features shown therein. Further, these embodiments may be combined with features, aspects, and/or implementations of any of the previous figures or otherwise described herein.

Block 1200 may involve obtaining, from persistent storage, a server-side log collected by a server device, where the server-side log includes a set of entries indicating a unique identifier, and where the unique identifier is assigned to a work item of a server-based application executed by the server device.

Block 1202 may involve receiving, from a client device disposed upon a network, a client-side log, where the client-side log includes operational data related to usage of a client-based application executed by the client device.

Block 1204 may involve identifying, from the operational data, the client-based application and one or more activities performed by the client-based application.

Block 1206 may involve determining that the one or more activities are related to the unique identifier.

Block 1208 may involve, based on the one or more activities, determining an action that can be taken to improve efficacy of the server-based application.

Block 1210 may involve writing to the persistent storage, a representation of the action.

In some embodiments, the operational data may include a screen capture of a display of the client device, where identifying the client-based application may comprise detecting a framed region within the screen capture that depicts an application user interface and determining the client-based application based on a title bar, logo, or text that is within the framed region and that has a predetermined association with the client-based application.

In some embodiments, the operational data may include a screen capture of a display of the client device, where identifying the one or more activities performed by the client-based application may comprise: (i) detecting a framed region within the screen capture that depicts an application user interface, wherein the application user interface contains text, (ii) determining that a subset of the text is within one or more text boxes at pre-determined locations within the application user interface or that the subset of the text is adjacent to one more or more text boxes at the pre-determined locations, and (iii) determining the one or more activities based on the subset of the text.

In some embodiments, the operational data may include a screen capture of a display of the client device, where determining that the one or more activities are related to the unique identifier comprises determining that the unique identifier appears within the screen capture.

In some embodiments, the client-side log may include the unique identifier, where determining that the one or more activities are related to the unique identifier is based on the unique identifier appearing in the client-side log along with the operational data.

In some embodiments, the server-based application may apply a state machine to the work item, where the state machine may have a plurality of states, where the server-side log identifies a particular state of the plurality of states to which the work item is assigned, and where the one or more processors may be further configured to associate the one or more activities with the particular state.

In some embodiments, associating the one or more activities with the particular state may include determining, from the client-side log and the server-side log that the one or more activities occurred while the work item was assigned to the particular state.

Some embodiments may further involve transmitting, to the client device, a blocked list specifying one or more applications or network addresses, where operational data is to be omitted from the client-side log for the one or more applications or when the client device accesses any of the network addresses.

Some embodiments may further involve transmitting, to the client device, an allowed list specifying one or more applications or network addresses, where operational data may to be included in the client-side log only for the one or more applications or when the client device accesses any of the network addresses.

In some embodiments, the operational data may identify the client-based application, the unique identifier, and timestamps specifying when one or more input pointer or keyboard activities relating to the client-based application occurred on the client device, and where determining the action that can be taken to improve efficacy of the server-based application may be based on the timestamps.

In some embodiments, determining the action that can be taken to improve efficacy of the server-based application may comprise determining, based on the timestamps, durations for each of the one or more activities, where the action is further based on the durations.

In some embodiments, determining the action that can be taken to improve efficacy of the server0based application may further comprise (i) determining that a particular duration for a particular activity of the one or more activities exceeds a threshold value, and (ii) based on the particular duration exceeding the threshold value, determining the action to be one or more of: recommending training of a user of the client device on carrying out the particular activity, recommending that a new software tool be employed for carrying out the particular activity, recommending that a new procedure be used when carrying out the particular activity, or recommending that the particular activity be automated.

In some embodiments, the server-side log may indicate a state of the server-based application, where the persistent storage may also contain a table mapping combinations of states of the server-based application and the one or more activities to specific actions, and wherein the specific actions include, for a particular activity: recommending training of a user of the client device on carrying out the particular activity, recommending that a new software tool be employed for carrying out the particular activity, recommending that a new procedure be used when carrying out the particular activity, or recommending that the particular activity be automated.

IX. Closing

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid-state drive, or another storage medium.

The computer readable medium can also include non-transitory computer readable media such as non-transitory computer readable media that store data for short periods of time like register memory and processor cache. The non-transitory computer readable media can further include non-transitory computer readable media that store program code and/or data for longer periods of time. Thus, the non-transitory computer readable media may include secondary or persistent long-term storage, like ROM, optical or magnetic disks, solid-state drives, or compact disc read only memory (CD-ROM), for example. The non-transitory computer readable media can also be any other volatile or non-volatile storage systems. A non-transitory computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments could include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A system comprising:
    persistent storage containing a server-side log that includes a set of entries indicating a unique identifier, and wherein the unique identifier is assigned to a work item of a server-based application; and
    one or more processors configured to:
        receive, from a client device, a client-side log, wherein the client-side log includes data related to usage of a client-based application;
        identify, from the client-side log, one or more activities performed by the client-based application that are related to the unique identifier;
        determine, from the one or more activities, an action that can be taken to improve use of the server-based application; and
        write, to the persistent storage, a representation of the action.

2. The system of claim 1, wherein the client-side log identifies the client-based application, the unique identifier, and timestamps specifying when one or more input pointer or keyboard activities relating to the client-based application occurred on the client device, and wherein determining the action that can be taken to improve efficacy of the server-based application is based on the timestamps.

3. The system of claim 2, wherein determining the action that can be taken to improve the use of the server-based application comprises:
    determining, based on the timestamps, durations for each of the one or more activities, wherein the action is further based on the durations.

4. The system of claim 3, wherein determining the action that can be taken to improve the use of the server-based application further comprises:
    determining that a particular duration for a particular activity of the one or more activities exceeds a threshold value; and
    based on the particular duration exceeding the threshold value, determining the action to be one or more of: recommending training of a user of the client device on carrying out the particular activity, recommending that a new software tool be employed for carrying out the particular activity, recommending that a new procedure be used when carrying out the particular activity, or recommending that the particular activity be automated.

5. The system of claim 1, wherein the server-side log was generated by the server-based application.

6. The system of claim 5, wherein the server-based application was executed by a server device that is physically distinct from the client-based application.

7. The system of claim 1, wherein the one or more processors are further configured to:
identify, from the client-side log, the client-based application.

8. The system of claim 7, wherein the client-side log includes a screen capture of a display of the client device, and wherein identifying the client-based application comprises:
detecting a framed region within the screen capture that depicts an application user interface; and
determining the client-based application based on a title bar, logo, or text that is within the framed region and that has a predetermined association with the client-based application.

9. The system of claim 1, wherein the server-based application applies a state machine to the work item, wherein the state machine has a plurality of states, wherein the server-side log identifies a particular state of the plurality of states to which the work item is assigned, and wherein the one or more processors are further configured to:
associate the one or more activities with the particular state.

10. The system of claim 9, wherein associating the one or more activities with the particular state comprises:
determining, from the client-side log and the server-side log, that the one or more activities occurred while the work item was assigned to the particular state.

11. The system of claim 1, wherein the server-side log indicates a state of the server-based application, wherein the persistent storage also contains a table mapping combinations of states of the server-based application and the one or more activities to specific actions, and wherein determining the action that can be taken to improve use of the server-based application comprises:
looking up the state of the server-based application and the one or more activities in the table to identify the action.

12. The system of claim 11, wherein the specific actions include, for a particular activity: recommending training of a user of the client device on carrying out the particular activity, recommending that a new software tool be employed for carrying out the particular activity, recommending that a new procedure be used when carrying out the particular activity, or recommending that the particular activity be automated.

13. The system of claim 1, wherein the client-side log includes a screen capture of a display of the client device, and wherein identifying the one or more activities performed by the client-based application comprises:
detecting a framed region within the screen capture that depicts an application user interface, wherein the application user interface contains text;
determining that a subset of the text is within one or more text boxes at pre-determined locations within the application user interface or that the subset of the text is adjacent to one more or more text boxes at the pre-determined locations; and
determining the one or more activities based on the subset of the text.

14. The system of claim 1, wherein the client-side log includes a screen capture of a display of the client device, and wherein determining that the one or more activities are related to the unique identifier comprises:
determining that the unique identifier appears within the screen capture.

15. The system of claim 1, wherein the client-side log also includes the unique identifier, and wherein determining that the one or more activities are related to the unique identifier is based on the unique identifier appearing in the client-side log.

16. The system of claim 1, wherein the one or more processors are further configured to:
transmit, to the client device, a blocked list specifying one or more applications or network addresses, wherein specific data is to be omitted from the client-side log for the one or more applications or when the client device accesses any of the network addresses.

17. The system of claim 1, wherein the one or more processors are further configured to:
transmit, to the client device, an allowed list specifying one or more applications or network addresses, wherein specific data is to be included in the client-side log only for the one or more applications or when the client device accesses any of the network addresses.

18. The system of claim 1, wherein the client-side log is collected and transmitted to the system by a client-side collector application executing on the client device.

19. A computer-implemented method comprising:
obtaining, from persistent storage, a server-side log that includes a set of entries indicating a unique identifier, and wherein the unique identifier is assigned to a work item of a server-based application;
receiving, from a client device, a client-side log, wherein the client-side log includes data related to usage of a client-based application;
identifying, from the client-side log, one or more activities performed by the client-based application that are related to the unique identifier;
determining, from the one or more activities, an action that can be taken to improve use of the server-based application; and
writing, to the persistent storage, a representation of the action.

20. An article of manufacture including a non-transitory computer-readable medium, having stored thereon program instructions that, upon execution by a computing system, cause the computing system to perform operations comprising:
obtaining, from persistent storage, a server-side log that includes a set of entries indicating a unique identifier, and wherein the unique identifier is assigned to a work item of a server-based application;
receiving, from a client device, a client-side log, wherein the client-side log includes data related to usage of a client-based application;
identifying, from the client-side log, one or more activities performed by the client-based application that are related to the unique identifier;
determining, from the one or more activities, an action that can be taken to improve use of the server-based application; and
writing, to the persistent storage, a representation of the action.

* * * * *